US012598617B2

(12) United States Patent
Han et al.

(10) Patent No.: US 12,598,617 B2
(45) Date of Patent: Apr. 7, 2026

(54) SCHEDULING METHOD, SCHEDULING SYSTEM, AND SCHEDULING APPARATUS FOR CALCULATING A CURRENT SCHEDULING DECISION BASED ON A PREVIOUS REWARD FEEDBACK

(71) Applicant: HUAWEI TECHNOLOGIES CO., LTD., Shenzhen (CN)

(72) Inventors: Yuchao Han, Hod Hasharon (IL); Aixiang Jin, Hangzhou (CN); Zhuofan Zhang, Hangzhou (CN); Jian Wang, Hangzhou (CN); Rong Li, Hangzhou (CN); Yinggang Du, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 631 days.

(21) Appl. No.: 17/988,815

(22) Filed: Nov. 17, 2022

(65) Prior Publication Data

US 2023/0072585 A1     Mar. 9, 2023

Related U.S. Application Data

(63) Continuation of application No. PCT/CN2021/089129, filed on Apr. 23, 2021.

(30) Foreign Application Priority Data

May 20, 2020     (CN) .......................... 202010430887.3

(51) Int. Cl.
*H04W 72/12*     (2023.01)
*H04W 72/23*     (2023.01)
*H04W 72/50*     (2023.01)

(52) U.S. Cl.
CPC ......... *H04W 72/23* (2023.01); *H04W 72/535* (2023.01)

(58) Field of Classification Search
CPC . H04W 72/23; H04W 72/535; H04W 72/232; H04W 72/20; H04W 72/21;
(Continued)

(56) References Cited

U.S. PATENT DOCUMENTS

| | | | | |
|---|---|---|---|---|
| 2006/0227800 A1* | 10/2006 | Hosein | .................. | H04L 1/0002 370/437 |
| 2015/0230220 A1* | 8/2015 | Li | .......................... | H04W 72/23 370/329 |
| 2021/0014872 A1* | 1/2021 | Sankaran | ................. | G06N 3/08 |

FOREIGN PATENT DOCUMENTS

| | | |
|---|---|---|
| CN | 101515847 A | 8/2009 |
| CN | 101754385 A | 6/2010 |

(Continued)

OTHER PUBLICATIONS

Chinese Office Action issued in corresponding Chinese Application No. 202010430887.3, dated Nov. 30, 2023, pp. 1-7.
(Continued)

*Primary Examiner* — Kiet Tang
(74) *Attorney, Agent, or Firm* — HAUPTMAN HAM, LLP

(57)     ABSTRACT

A scheduling method, a scheduling system, and a scheduling apparatus. After obtaining a reward feedback for a previous scheduling decision sent by a terminal device, a scheduler sends, in N time units after the reward feedback is received, a current scheduling decision calculated based on the reward feedback, where N>1 and N is an integer. Sufficient time is provided for the scheduler to calculate and code the scheduling decision, thereby effectively resolving a problem that a scheduling procedure mismatches and conflicts with an over-the-air time sequence in response to the scheduler not obtaining a reward of the previous scheduling decision in time.

9 Claims, 13 Drawing Sheets

(58) Field of Classification Search
CPC ........ G06N 3/006; G06N 3/092; G06N 20/00;
H04L 47/39
See application file for complete search history.

(56) References Cited

FOREIGN PATENT DOCUMENTS

| CN | 104412639 A | 3/2015 |
|----|-------------|--------|
| WO | 2019190476 A1 | 10/2019 |

OTHER PUBLICATIONS

Extended European Search Report issued in corresponding European Application No. 21809268.2, dated Oct. 9, 2023, pp. 1-9.
International Search Report issued in corresponding International Application No. PCT/CN2021/089129, dated Jul. 15, 2021, pp. 1-10.

* cited by examiner

S401. A first scheduler obtains a first reward feedback in an $i^{th}$ time unit S402. The first scheduler determines a first scheduling decision based on the first reward feedback S403. The first scheduler sends the first scheduling decision in an $(i+N)^{th}$ time unit

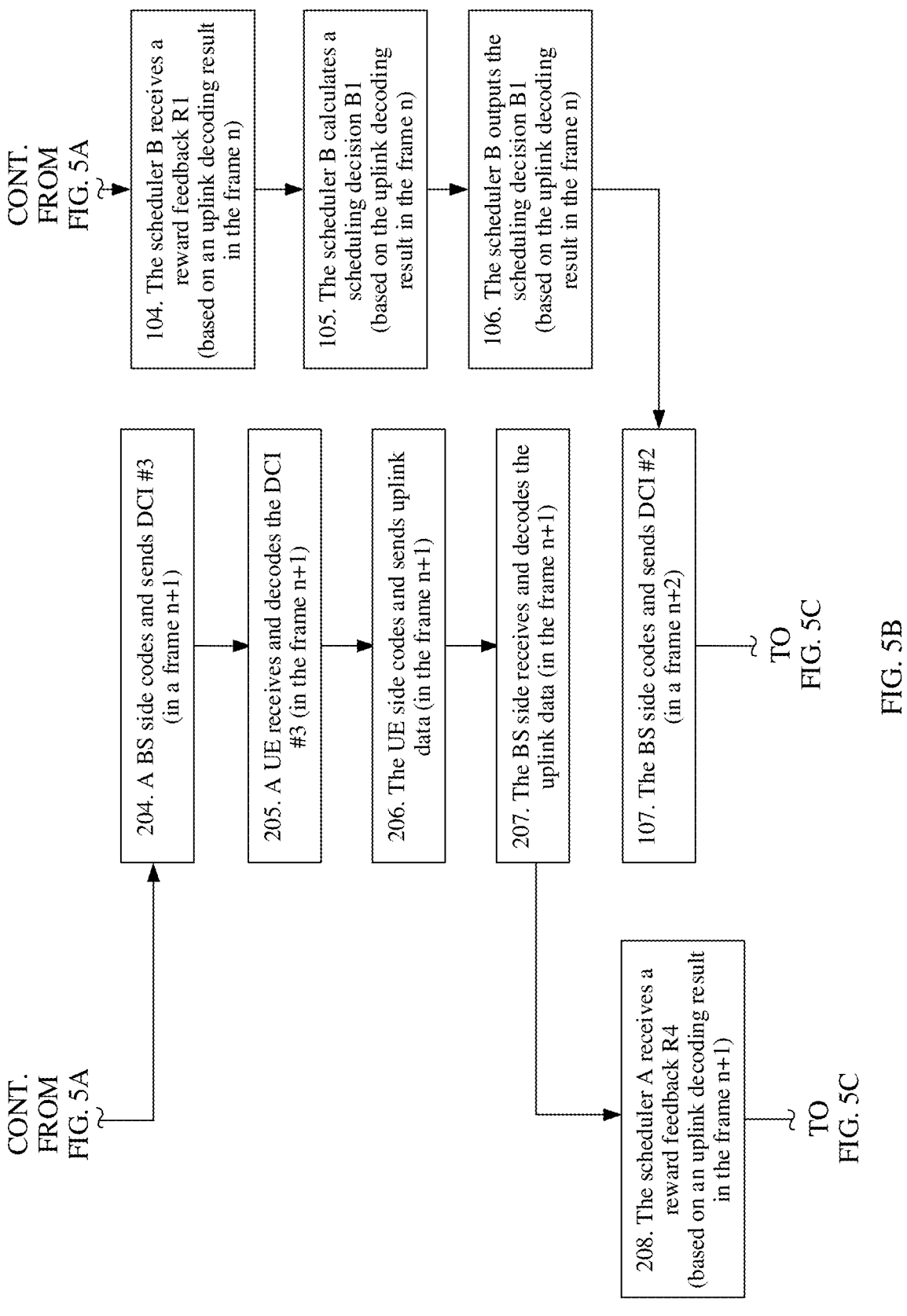

CONT.
FROM
FIG. 5A

104. The scheduler B receives a reward feedback R1 (based on an uplink decoding result in the frame n)

105. The scheduler B calculates a scheduling decision B1 (based on the uplink decoding result in the frame n)

106. The scheduler B outputs the scheduling decision B1 (based on the uplink decoding result in the frame n)

CONT.
FROM
FIG. 5A

204. A BS side codes and sends DCI #3 (in a frame n+1)

205. A UE receives and decodes the DCI #3 (in the frame n+1)

206. The UE side codes and sends uplink data (in the frame n+1)

207. The BS side receives and decodes the uplink data (in the frame n+1)

107. The BS side codes and sends DCI #2 (in a frame n+2)

TO
FIG. 5C

208. The scheduler A receives a reward feedback R4 (based on an uplink decoding result in the frame n+1)

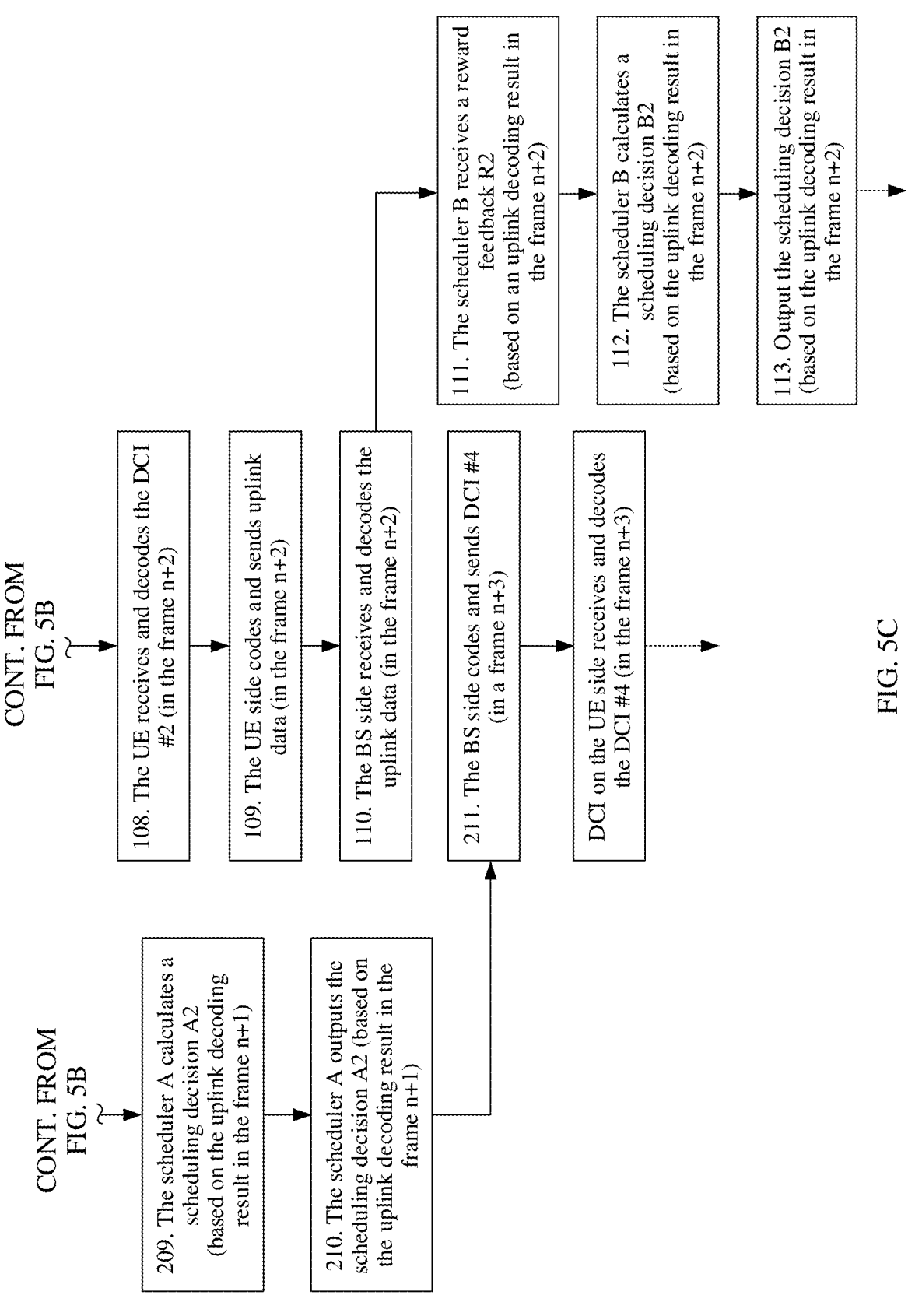

CONT. FROM
FIG. 5B

108. The UE receives and decodes the DCI #2 (in the frame n+2)

109. The UE side codes and sends uplink data (in the frame n+2)

110. The BS side receives and decodes the uplink data (in the frame n+2)

211. The BS side codes and sends DCI #4 (in a frame n+3)

DCI on the UE side receives and decodes the DCI #4 (in the frame n+3)

CONT. FROM
FIG. 5B

209. The scheduler A calculates a scheduling decision A2 (based on the uplink decoding result in the frame n+1)

210. The scheduler A outputs the scheduling decision A2 (based on the uplink decoding result in the frame n+1)

111. The scheduler B receives a reward feedback R2 (based on an uplink decoding result in the frame n+2)

112. The scheduler B calculates a scheduling decision B2 (based on the uplink decoding result in the frame n+2)

113. Output the scheduling decision B2 (based on the uplink decoding result in the frame n+2)

FIG. 5C

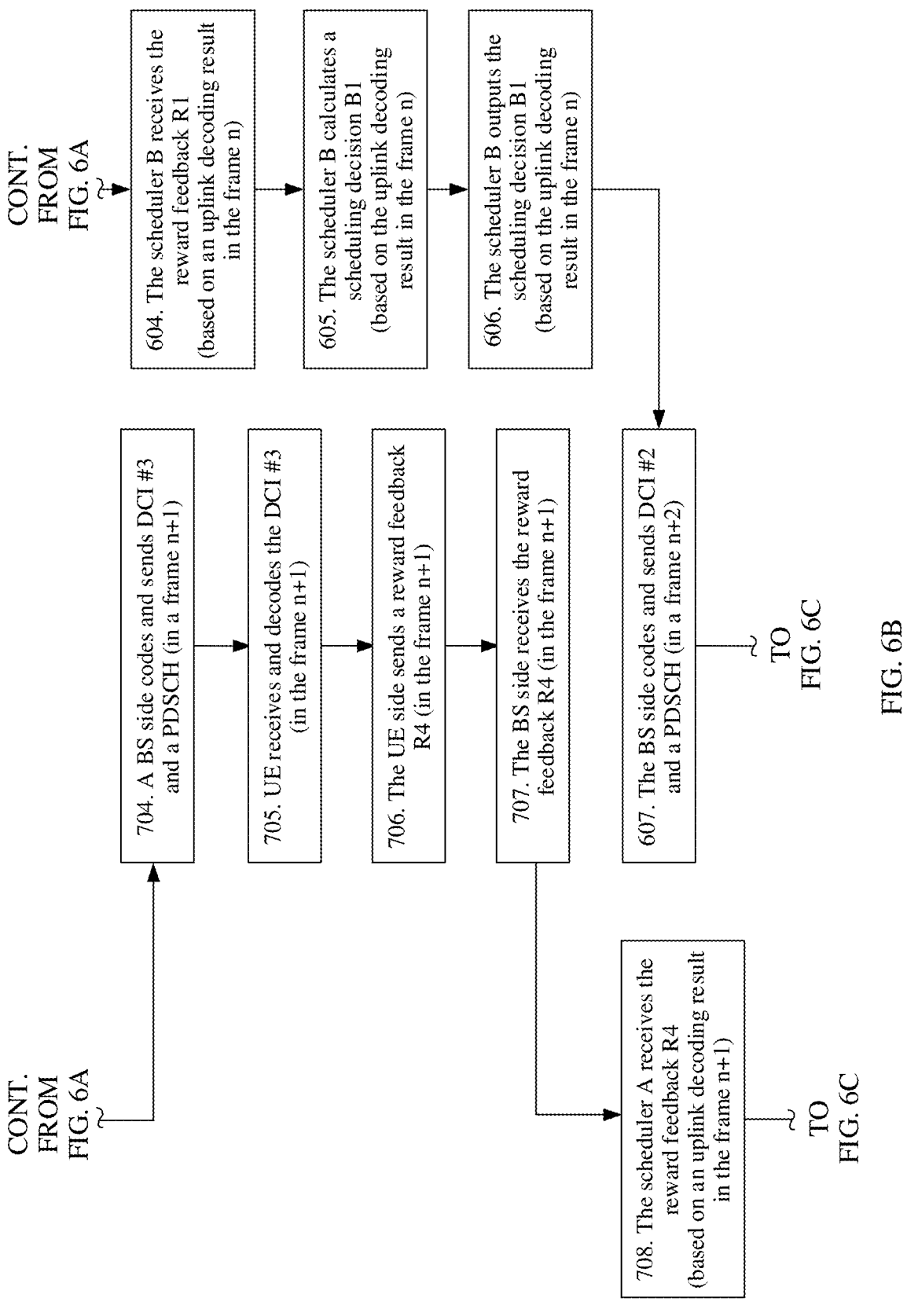

CONT.
FROM
FIG. 6A

604. The scheduler B receives the reward feedback R1 (based on an uplink decoding result in the frame n)

605. The scheduler B calculates a scheduling decision B1 (based on the uplink decoding result in the frame n)

606. The scheduler B outputs the scheduling decision B1 (based on the uplink decoding result in the frame n)

CONT.
FROM
FIG. 6A

704. A BS side codes and sends DCI #3 and a PDSCH (in a frame n+1)

705. UE receives and decodes the DCI #3 (in the frame n+1)

706. The UE side sends a reward feedback R4 (in the frame n+1)

707. The BS side receives the reward feedback R4 (in the frame n+1)

607. The BS side codes and sends DCI #2 and a PDSCH (in a frame n+2)

TO
FIG. 6C

708. The scheduler A receives the reward feedback R4 (based on an uplink decoding result in the frame n+1)

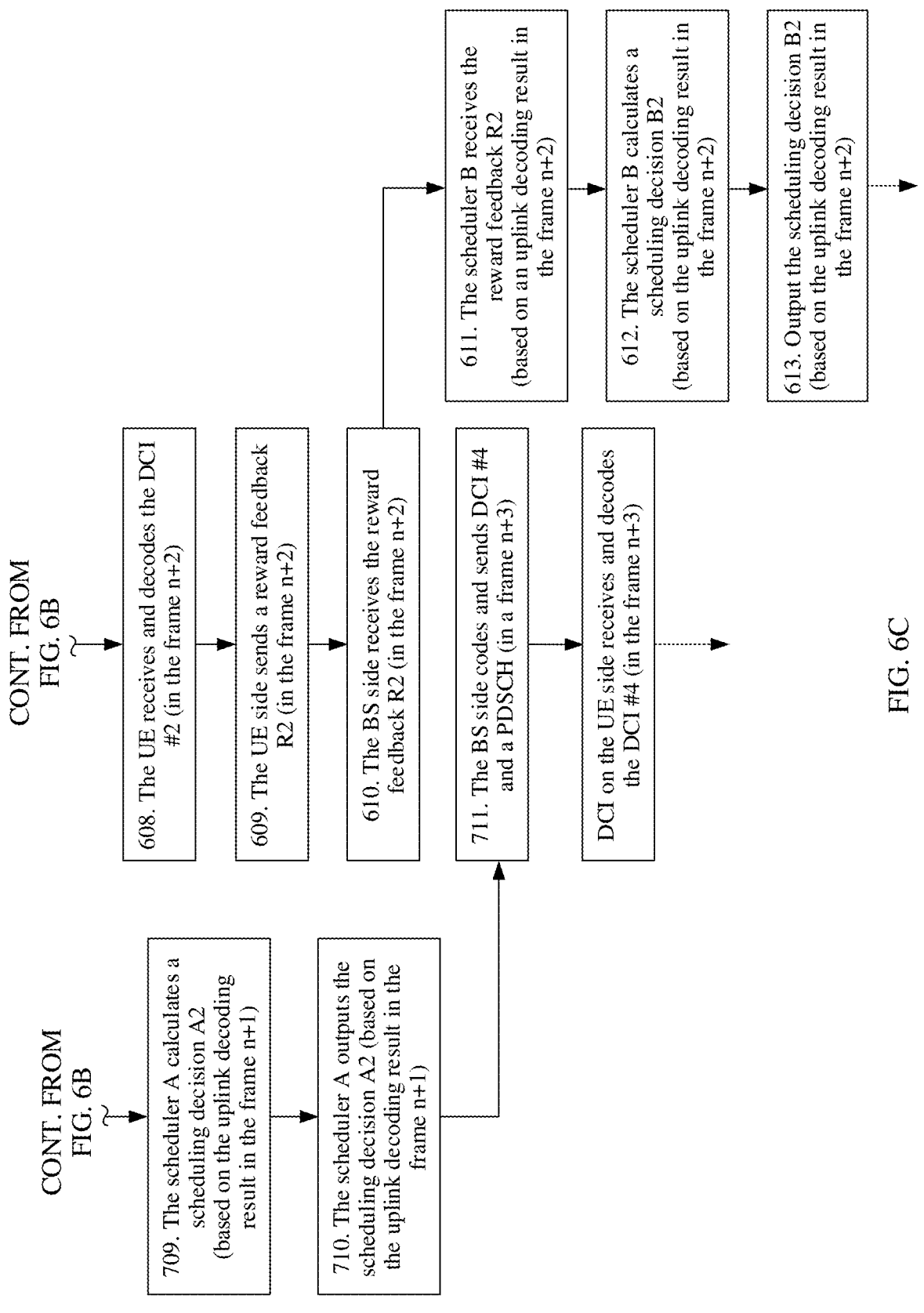

CONT. FROM FIG. 6B

608. The UE receives and decodes the DCI #2 (in the frame n+2)

609. The UE side sends a reward feedback R2 (in the frame n+2)

610. The BS side receives the reward feedback R2 (in the frame n+2)

711. The BS side codes and sends DCI #4 and a PDSCH (in a frame n+3)

DCI on the UE side receives and decodes the DCI #4 (in the frame n+3)

611. The scheduler B receives the reward feedback R2 (based on an uplink decoding result in the frame n+2)

612. The scheduler B calculates a scheduling decision B2 (based on the uplink decoding result in the frame n+2)

613. Output the scheduling decision B2 (based on the uplink decoding result in the frame n+2)

CONT. FROM FIG. 6B

709. The scheduler A calculates a scheduling decision A2 (based on the uplink decoding result in the frame n+1)

710. The scheduler A outputs the scheduling decision A2 (based on the uplink decoding result in the frame n+1)

FIG. 6C

SCHEDULING METHOD, SCHEDULING SYSTEM, AND SCHEDULING APPARATUS FOR CALCULATING A CURRENT SCHEDULING DECISION BASED ON A PREVIOUS REWARD FEEDBACK

CROSS-REFERENCE TO RELATED APPLICATIONS

This application is a continuation of International Application No. PCT/CN2021/089129, filed on Apr. 23, 2021, which claims priority to Chinese Patent Application No. 202010430887.3, filed on May 20, 2020. The disclosures of the aforementioned applications are hereby incorporated by reference in their entireties.

TECHNICAL FIELD

This application relates to the communications field, and more specifically, to a scheduling method, a scheduling system, and a scheduling apparatus.

BACKGROUND

In a cellular network, scheduling on a media access control (MAC) layer mainly resolves problems such as time-frequency resource allocation, modulation and coding scheme (MCS) selection, user pairing, and precoding, to implement a compromise between system throughput and fairness through scheduling.

Currently, a base station (BS) scheduler that uses deep reinforcement learning can better implement a compromise between system throughput and fairness. In a process of performing deep reinforcement learning, after receiving a reward feedback for a previous scheduling decision, the scheduler needs to determine a current scheduling decision based on the reward feedback, and then sends the current scheduling decision to a BS for downlink control information (DCI) coding. Afterwards, the BS sends coded DCI to a terminal device at agreed time. In practice, the scheduler may be unable to obtain a reward of the previous scheduling decision in time, and the BS cannot send DCI coding for the current scheduling decision at the time agreed with a system, which causes an over-the-air feedback delay. As a result, deep reinforcement training cannot be performed for the scheduler in a time sequence.

SUMMARY

This application provides a scheduling method, a scheduling system, and a scheduling apparatus, to effectively resolve a problem that a scheduling procedure mismatches and conflicts with an over-the-air time sequence when a scheduler cannot obtain a reward of a previous scheduling decision in time.

According to a first aspect, a scheduling method is provided and is applied to a scheduling system including at least one scheduler, where the scheduling system includes a first scheduler. The method includes: The first scheduler obtains a first reward feedback in an $i^{th}$ time unit, where $i \geq 1$ and $i$ is an integer; the first scheduler determines a first scheduling decision based on the first reward feedback, where the first reward feedback is determined by a terminal device based on a second scheduling decision, and the second scheduling decision is a previous scheduling decision determined by the first scheduler before the first scheduling decision; and the first scheduler sends the first scheduling decision in an $(i+N)^{th}$ time unit, where $N>1$ and $N$ is an integer.

In the foregoing technical solution, when obtaining a reward feedback for a previous scheduling decision, a scheduler may send, in an $N^{th}$ time units after the reward feedback is received, a current scheduling decision calculated based on the reward feedback, so that sufficient time can be left for the scheduler to calculate and code a scheduling decision, thereby effectively resolving a problem that a scheduling procedure mismatches and conflicts with an over-the-air time sequence when the scheduler cannot obtain a reward of the previous scheduling decision in time.

With reference to the first aspect, in some implementations of the first aspect, the scheduling system further includes one or more second schedulers, and the method further includes: The second scheduler obtains a second reward feedback in an $(i+j)^{th}$ time unit, where $1 \leq j \leq N-1$ and $j$ is an integer; the second scheduler determines a third scheduling decision based on the second reward feedback, where the second reward feedback is determined by the terminal device based on a fourth scheduling decision, the fourth scheduling decision is a previous scheduling decision determined by the second scheduler before the third scheduling decision, and the scheduling decision determined by the first scheduler and the scheduling decision determined by the second scheduler are respectively scheduling decisions of the first scheduler and the second scheduler for a same task; and the second scheduler sends the second scheduling decision in an $(i+j+M)^{th}$ time unit, where $M>1$ and $M$ is an integer.

Compared with a use scenario in which only one scheduler is used, the foregoing technical solution has a wider use scenario, and a scheduling procedure solution in which a plurality of schedulers cooperate in scheduling is used. The first scheduler and the second scheduler alternately obtain an uplink reward feedback and output a scheduling policy, thereby effectively improving adaptability of the scheduler to an over-the-air environment.

With reference to the first aspect, in some implementations of the first aspect, the first scheduler sends first information to the second scheduler, where the first information includes the first scheduling decision or a third reward feedback, and the third reward feedback is determined by the terminal device based on the first scheduling decision. The second scheduler receives the first information and adjusts a subsequent scheduling decision for the task based on the first information.

In the foregoing technical solution, schedulers each have a function of exchanging information with each other, and can adjust a scheduling parameter of the scheduler, to ensure that scheduling policies of different schedulers are similar or the same and a scheduling reward is maximized.

With reference to the first aspect, in some implementations of the first aspect, the second scheduler sends second information to the first scheduler, where the second information includes the second scheduling decision or a fourth reward feedback, and the fourth reward feedback is determined by the terminal device based on the second scheduling decision. The first scheduler receives the second information and adjusts a subsequent scheduling decision for the task based on the second information.

In the foregoing technical solution, schedulers each have a function of exchanging information with each other, and can adjust a scheduling parameter of the scheduler, to ensure that scheduling policies of different schedulers are similar or the same and a scheduling reward is maximized.

According to a second aspect, a scheduling method is provided, and the method includes: A terminal device sends a first reward feedback in an $i^{th}$ time unit, where i≥1 and i is an integer; and the terminal device receives, in an $(i+N)^{th}$ time unit, a first scheduling decision determined by a first scheduler based on the first reward feedback, where the first reward feedback is determined by the terminal device based on a second scheduling decision, the second scheduling decision is a previous scheduling decision determined by the first scheduler before the first scheduling decision, and N>1 and N is an integer.

In the foregoing technical solution, after sending a reward feedback, the terminal device receives, after a period of time, a scheduling decision of a scheduler for the reward feedback. In this way, sufficient time can be left for the scheduler to calculate and code a scheduling decision, thereby effectively resolving a problem that a scheduling procedure mismatches and conflicts with an over-the-air time sequence when the scheduler cannot obtain a reward of a previous scheduling decision in time.

With reference to the second aspect, in some implementations of the second aspect, the terminal device sends a second reward feedback in an $(i+j)^{th}$ time unit, where 1≤j≤N−1 and j is an integer. The terminal device receives, in an $(i+j+M)^{th}$ time unit, a third scheduling decision determined by a second scheduler based the second reward feedback, where M>1 and M is an integer, the second reward feedback is determined by the terminal device based on a fourth scheduling decision, the fourth scheduling decision is a previous scheduling decision determined by the second scheduler before the third scheduling decision, and the scheduling decision determined by the first scheduler and the scheduling decision determined by the second scheduler are respectively scheduling decisions of the first scheduler and the second scheduler for a same task.

In the foregoing technical solution, a scheduling procedure solution in which a plurality of schedulers cooperate in scheduling is used, and the terminal device alternately receives scheduling decisions of different schedulers, determines reward feedbacks based on the scheduling decisions of different schedulers, and sends the reward feedback to a corresponding scheduler, thereby effectively improving adaptability of the scheduler to an over-the-air environment.

With reference to the second aspect, in some implementations of the second aspect, N is equal to 2.

With reference to the second aspect, in some implementations of the second aspect, a value of N is stipulated in a communications system or a communications protocol.

According to a third aspect, a scheduling system is provided, and the scheduling system includes a first scheduler, configured to obtain a first reward feedback in an $i^{th}$ time unit, where i≥1 and i is an integer. The first scheduler is further configured to determine a first scheduling decision based on the first reward feedback, where the first reward feedback is determined by a terminal device based on a second scheduling decision, and the second scheduling decision is a previous scheduling decision determined by the first scheduler before the first scheduling decision. The first scheduler is further configured to send the first scheduling decision in an $(i+N)^{th}$ time unit, where N>1 and N is an integer.

With reference to the third aspect, in some implementations of the third aspect, the scheduling system further includes one or more second schedulers. The second scheduler is configured to obtain a second reward feedback in an $(i+j)^{th}$ time unit, where 1≤j≤N−1 and j is an integer. The second scheduler is further configured to determine a third scheduling decision based on the second reward feedback, where the second reward feedback is determined by the terminal device based on a fourth scheduling decision, the fourth scheduling decision is a previous scheduling decision determined by the second scheduler before the third scheduling decision, and the scheduling decision determined by the first scheduler and the scheduling decision determined by the second scheduler are respectively scheduling decisions of the first scheduler and the second scheduler for a same task. The second scheduler is further configured to send the second scheduling decision in an $(i+j+M)^{th}$ time unit, where M>1 and M is an integer.

With reference to the third aspect, in some implementations of the third aspect, the first scheduler is further configured to send first information to the second scheduler, where the first information includes the first scheduling decision or a third reward feedback, and the third reward feedback is determined by the terminal device based on the first scheduling decision. The second scheduler is configured to receive the first information and adjust a subsequent scheduling decision for the task based on the first information.

With reference to the third aspect, in some implementations of the third aspect, the second scheduler is further configured to send second information to the first scheduler, where the second information includes the second scheduling decision or a fourth reward feedback, and the fourth reward feedback is determined by the terminal device based on the second scheduling decision. The first scheduler is further configured to receive the second information and adjust a subsequent scheduling decision for the task based on the second information.

For beneficial effects generated by the third aspect, refer to the description in the first aspect. Details are not described herein again.

According to a fourth aspect, a scheduling apparatus is provided, and the scheduling apparatus is configured to perform the scheduling method provided in the first aspect. Specifically, the scheduling apparatus may include a module configured to perform the scheduling method provided in the first aspect.

According to a fifth aspect, a scheduling apparatus is provided, and the scheduling apparatus is configured to perform the scheduling method provided in the second aspect. Specifically, the scheduling apparatus may include a module configured to perform the scheduling method provided in the second aspect.

According to a sixth aspect, a scheduling apparatus is provided, including a processor. The processor is coupled to a memory, and may be configured to execute instructions in the memory to implement the scheduling method in any one of the first aspect and the possible implementations of the first aspect. Optionally, the scheduling apparatus further includes the memory. Optionally, the scheduling apparatus further includes a communications interface, the processor is coupled to the communications interface, and the communications interface is configured to input and/or output information. The information includes at least one of an instruction or data.

In an implementation, the scheduling apparatus is a first scheduler or a second scheduler. When the scheduling apparatus is the first scheduler or the second scheduler, the communications interface may be a transceiver or an input/output interface.

In another implementation, the scheduling apparatus is a chip or a chip system. When the scheduling apparatus is the chip or the chip system, the communications interface may be an input/output interface, an interface circuit, an output circuit, an input circuit, a pin, a related circuit on the chip or the chip system, or the like. The processor may alternatively be embodied as a processing circuit or a logic circuit.

In another implementation, the scheduling apparatus is a chip or a chip system configured in the first scheduler or the second scheduler.

Optionally, the transceiver may be a transceiver circuit. Optionally, the input/output interface may be an input/output circuit.

According to a seventh aspect, a scheduling apparatus is provided, including a processor. The processor is coupled to a memory, and may be configured to execute instructions in the memory to implement the scheduling method in any one of the second aspect and the possible implementations of the second aspect. Optionally, the scheduling apparatus further includes the memory. Optionally, the scheduling apparatus further includes a communications interface, the processor is coupled to the communications interface, and the communications interface is configured to input and/or output information. The information includes at least one of an instruction or data.

In an implementation, the scheduling apparatus is a terminal device. When the scheduling apparatus is the terminal device, the communications interface may be a transceiver or an input/output interface.

In another implementation, the scheduling apparatus is a chip or a chip system. When the scheduling apparatus is the chip or the chip system, the communications interface may be an input/output interface on the chip or the chip system, an interface circuit, an output circuit, an input circuit, a pin, a related circuit, or the like. The processor may alternatively be embodied as a processing circuit or a logic circuit.

In another implementation, the scheduling apparatus is a chip or a chip system configured in the terminal device.

Optionally, the transceiver may be a transceiver circuit. Optionally, the input/output interface may be an input/output circuit.

According to an eighth aspect, a computer-readable storage medium is provided, and the computer-readable storage medium stores a computer program. When the computer program is executed by a scheduling apparatus, the scheduling apparatus is enabled to perform the scheduling method in any one of the first aspect and the possible implementations of the first aspect.

According to a ninth aspect, a computer-readable storage medium is provided, and the computer-readable storage medium stores a computer program. When the computer program is executed by a scheduling apparatus, the scheduling apparatus is enabled to perform the scheduling method in any one of the second aspect and the possible implementations of the second aspect.

According to a tenth aspect, a computer program product including instructions is provided, and when the instructions are executed by a computer, a scheduling apparatus is enabled to implement the scheduling method provided in the first aspect.

According to an eleventh aspect, a computer program product including instructions is provided, and when the instructions are executed by a computer, a scheduling apparatus is enabled to implement the scheduling method provided in the second aspect.

According to a twelfth aspect, a scheduling system is provided, including the foregoing first scheduler and terminal device, or including the foregoing first scheduler, second scheduler, and terminal device.

BRIEF DESCRIPTION OF DRAWINGS

FIG. 5A, FIG. 5B, and FIG. 5C are a schematic flowchart of an uplink BS scheduling method according to an embodiment of this application;

FIG. 6A, FIG. 6B, and FIG. 6C are a schematic flowchart of a downlink BS scheduling method according to an embodiment of this application;

DESCRIPTION OF EMBODIMENTS

The following describes technical solutions of this application with reference to the accompanying drawings.

The technical solutions in the embodiments of this application may be applied to various communications systems, for example, a fifth-generation (5G) system such as a Long Term Evolution (LTE) system, an LTE frequency division duplex (FDD) system, an LTE time division duplex (TDD) system, a universal mobile telecommunication system (UMTS), or a new radio (NR) system, a satellite communications system, and another evolved communications system in the future.

Figure 1:
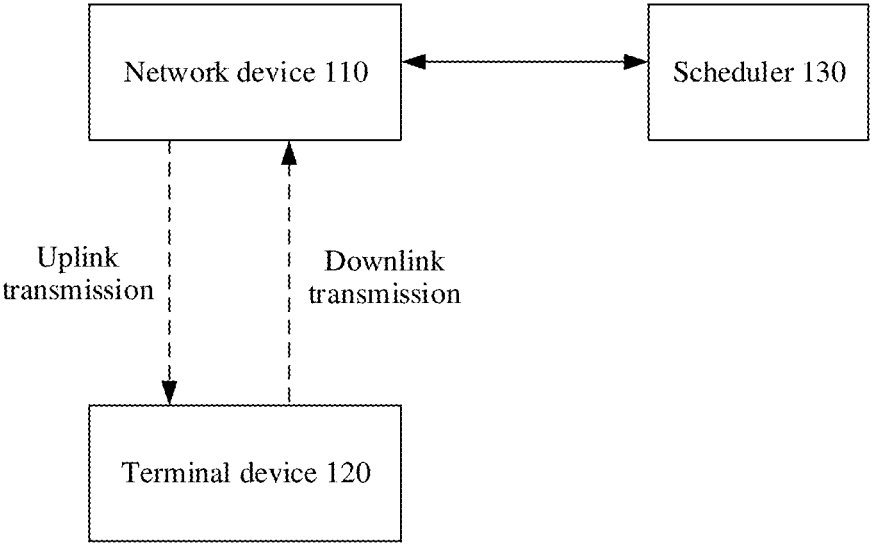
FIG. 1 is a schematic diagram of a network architecture applicable to an embodiment of this application.

FIG. 1 is a schematic diagram of a network architecture applicable to an embodiment of this application. As shown in FIG. 1, the network architecture may include at least one network device 110, at least one terminal device 120, and at least one scheduler 130. The terminal device 120 may be mobile or fixed. The network device 110 is a device that can communicate with the terminal device 120 by using a wireless link, for example, a base station or a base station controller. The scheduler 130 may exchange information with the network device 110 and the terminal device 120 to implement a compromise between system throughput and fairness. It should be understood that FIG. 1 merely illustrates only one network device, one terminal device, and one scheduler, but this is not intended to constitute a limitation on this application.

Optionally, the network device 110 and the scheduler 130 may be devices physically independent of each other, or the network device 110 may be integrated with the scheduler 130. This is not limited in this specification.

A plurality of antennas may be configured for each of the foregoing communications devices. The plurality of antennas may include at least one transmit antenna used to send a signal and at least one receive antenna used to receive a signal. In addition, each communications device may further additionally include a transmitter chain and a receiver chain. A person of ordinary skill in the art may understand that the communications devices each may include a plurality of components (for example, a processor, a modulator, a multiplexer, a demodulator, a demultiplexer, or an antenna) related to signal sending and receiving. Therefore, the network device may communicate with the terminal device by using a multi-antenna technology.

In the embodiments of this application, the network device may be any device that has a wireless receiving/transmitting function. The network device includes but is not limited to an evolved NodeB (eNB), a radio network controller (RNC), a NodeB (NB), a home base station (for example, a home evolved NodeB, or a home NodeB, HNB), a baseband unit (BBU), an access point (AP), a radio relay node, a radio backhaul node, a transmission point (TP), or a transmission and reception point (TRP) in a wireless fidelity (Wi-Fi) system, a gNB or a transmission point (TRP or TP) in a 5G (such as NR) system, one antenna panel or a group of antenna panels of a gNB in the 5G system, or a network node forming a gNB or a transmission point, such as a baseband unit (BBU) or a distributed unit (DU).

The network device may communicate with the terminal device by using uplink transmission data or downlink transmission data. The terminal device in embodiments of this application may also be referred to as user equipment (UE), an access terminal, a subscriber unit, a subscriber station, a mobile station, a mobile console, a remote station, a remote terminal, a mobile device, a user terminal, a terminal, a wireless communication device, a user agent, a user apparatus, or the like. The terminal device in the embodiments of this application may be a mobile phone (mobile phone), a tablet computer (pad), a computer with a wireless receiving/transmitting function, a virtual reality (VR) terminal device, an augmented reality (AR) terminal device, a wireless terminal in industrial control (industrial control), a wireless terminal in self driving (self driving), a wireless terminal in remote medical (remote medical), a wireless terminal in a smart grid (smart grid), a wireless terminal in transportation safety (transportation safety), a wireless terminal in a smart city (smart city), a wireless terminal in a smart home (smart home), a cellular phone, a cordless phone, a session initiation protocol (SIP) phone, a wireless local loop (WLL) station, a personal digital assistant (PDA), a handheld device with a wireless communication function, a computing device, another processing device connected to a wireless modem, an in-vehicle device, a wearable device, a terminal device in a 5G network, a terminal device in a non-public network, or the like.

The wearable device may also be referred to as a wearable intelligent device, and is a general term for wearable devices, such as glasses, gloves, watches, clothes, and shoes, that are developed by applying wearable technologies to intelligent designs of daily wear. The wearable device is a portable device that is directly worn on a body or integrated into clothes or an accessory of a user. The wearable device is not merely a hardware device, but is used to implement a powerful function through software support, data interaction, and cloud interaction. In a board sense, wearable intelligent devices include full-featured and large-sized devices that can implement complete or partial functions without depending on smartphones, such as smart watches or smart glasses, and devices that focus on only one type of application function and need to work with other devices such as smartphones, such as various smart bands or smart jewelry for monitoring physical signs.

In addition, the terminal device may be a terminal device in an Internet of Things (IoT) system. The IoT is an important part of information technology development in the future, and a main technical feature of the IoT is to connect an article to a network by using a communications technology, to implement an intelligent network in which a human and a computer are interconnected and things are interconnected.

To facilitate understanding of the embodiments of this application, terms in this application are first briefly described.

1. Reinforcement Learning

Figure 2:
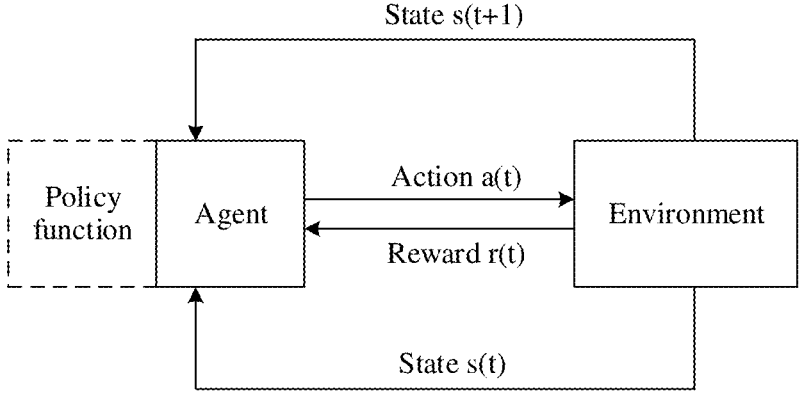
FIG. 2 is a schematic diagram of a reinforcement learning training process.

Reinforcement learning is a field in machine learning. FIG. 2 is a schematic diagram of a reinforcement learning training process. As shown in FIG. 1, reinforcement learning mainly includes four elements: an agent (agent), an environment (environment), a state (state), and an action (action) and reward (reward). Input of the agent is the state, and output of the agent is the action.

In a current technology, a reinforcement learning training process is as follows: The agent interacts with the environment a plurality of times to obtain an action, a state, and a reward in each time of interaction. The plurality of groups of (actions, states, and rewards) are used as training data to train the agent once. A next round of training is performed on the agent by using the foregoing process until a convergence condition is met. A process of obtaining an action, a state, and a reward in one time of interaction is shown in FIG. 2. A current state s(t) of the environment is input to the agent to obtain an action a(t) that is output by the agent, and a reward r(t) in current interaction is calculated based on a related performance indicator of the environment under action of the action a(t). Therefore, the action a(t), and the reward r(t) in the current interaction are obtained. The the action a(t), and the reward r(t) in the current interaction are recorded for subsequent training of the agent. A next state s(t+1) of the environment under action of the action a(t) is further recorded to implement next interaction between the agent and the environment.

2. Deep Reinforcement Learning (DRL)

Deep reinforcement learning is obtained by combining reinforcement learning and deep learning. Deep reinforcement learning still complies with a framework of interaction between a subject and an environment in reinforcement learning. A difference lies in that a deep neural network is used in an agent (agent) to make a decision.

Figure 3:
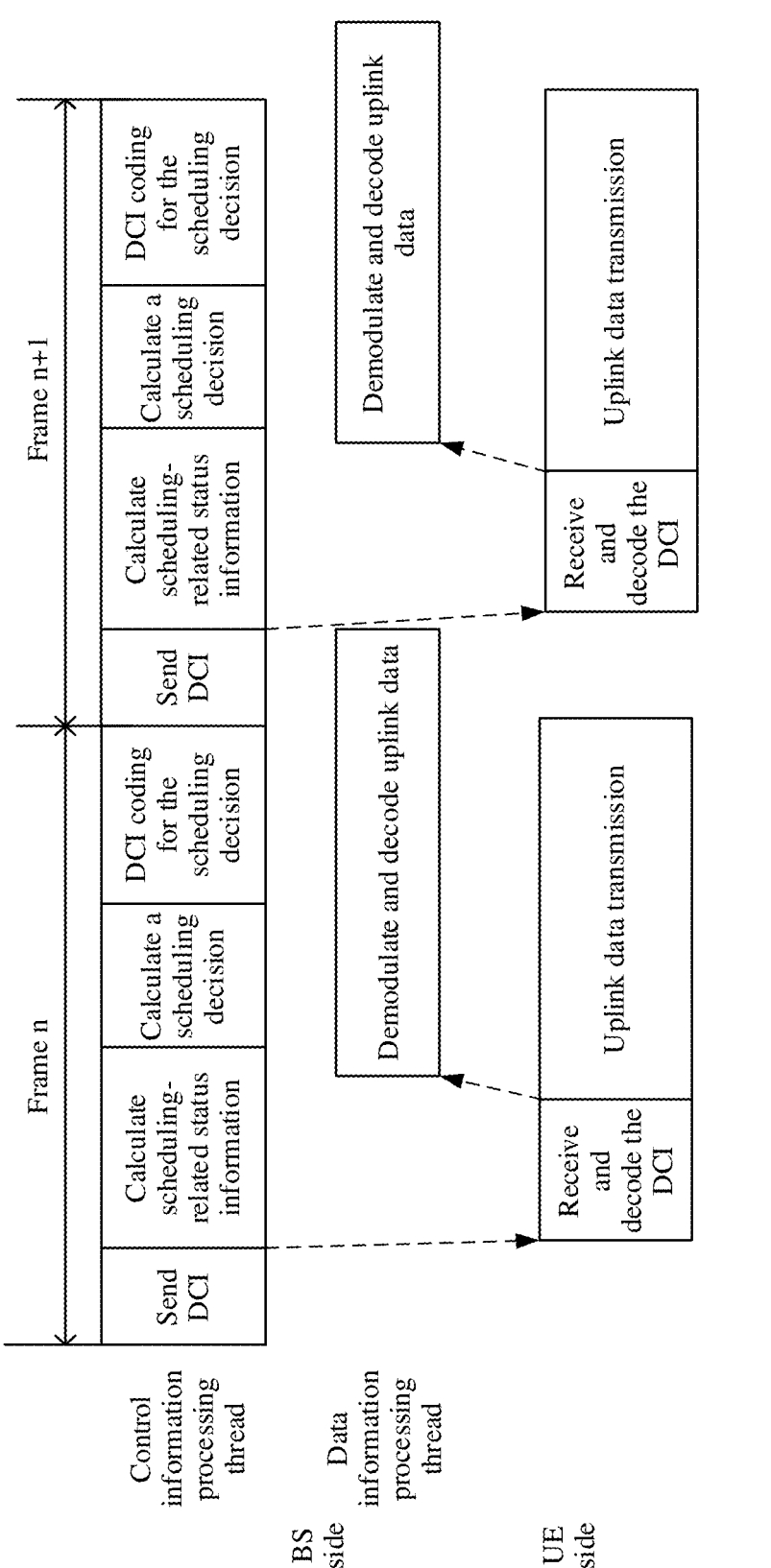
FIG. 3 is a diagram of a processing time sequence in which a BS and UE perform scheduling through deep reinforcement learning.

FIG. 3 is a diagram of a processing time sequence in which a BS and UE perform scheduling through deep reinforcement learning. Currently, a working procedure of a BS scheduler based on deep reinforcement learning is usually as follows.

a. The scheduler obtains a scheduling reward feedback. For example, the scheduler obtains, in a frame n, uplink data sent by UE, and demodulates and decodes the uplink data to obtain a reward feedback for a scheduling decision that is lately output by the scheduler.

In deep reinforcement learning, a reward feedback, may be used to determine impact of a scheduling decision on system throughput and fairness of a user. For example, a scheduling decision A of the scheduler can improve the system throughput and fairness of the user, so that a terminal device feeds back a high reward for the scheduling decision A. Similarly, if a scheduling decision B of the scheduler reduces the system throughput and fairness of the user, the terminal device feeds back a low reward for the scheduling decision B. In this way, the scheduler can continuously update a scheduling decision based on a reward feedback sent by the terminal device, to determine an optimal scheduling decision.

b. The scheduler outputs a scheduling decision, and the BS codes DCI and sends coded DCI. For example, the scheduler determines a current scheduling decision based on a reward feedback obtained in the frame n, the BS codes the current scheduling decision to generate DCI #1, and the BS sends the DCI #1 to the UE in a frame (n+1).

c. A reward feedback obtained after the scheduling decision is obtained in an uplink manner. For example, after receiving the DCI #1 sent by the BS, the UE decodes the DCI #1, and sends a reward feedback (that is, uplink data) to the BS based on a decoding result. Correspondingly, the BS scheduler obtains, in the frame (n+1), the reward feedback sent by the UE.

d. An updated decision is coded again to generate DCI for sending. For example, the BS scheduler performs, based on uplink data, decision coding again in the frame (n+1) to generate DCI #2, and sends the DCI #2 to the UE in a frame (n+2).

The scheduling procedure of the scheduler may be limited by step c of obtaining, in an uplink manner, a reward obtained after the decision. First, a length of time required by step c directly affects a response speed of the BS scheduler. If feedback time is excessively long, dynamic adaptability of the scheduler decreases. In addition, different frame structures also greatly affect time-effectiveness of step c. For example, in a system frame of 10 ms, the BS delivers DCI in a subframe 0 of the frame (n+1). If the UE reports a scheduling reward in a subframe 9 of the frame n, because DCI coding needs to be performed in advance, the BS cannot include, in the subframe 0 of the frame (n+1), the scheduling reward feedback reported in the subframe 9 of the frame n, which causes an over-the-air feedback delay. Therefore, deep reinforcement learning cannot be effectively trained based on the time sequence.

In view of this, this application provides a scheduling method to resolve impact of an over-the-air feedback delay on deep reinforcement learning of a scheduler.

In all the embodiments of this application, one or more time units may be included in time domain. For example, in time domain, a frame (frame) whose time length is 10 ms may be obtained through division, each frame is divided into 10 subframes (subframe) with a same length of 1 ms, and each subframe may include one or more timeslots. As an example instead of a limitation, the time unit in the embodiments of this application is described by using a frame as an example.

Figure 4:
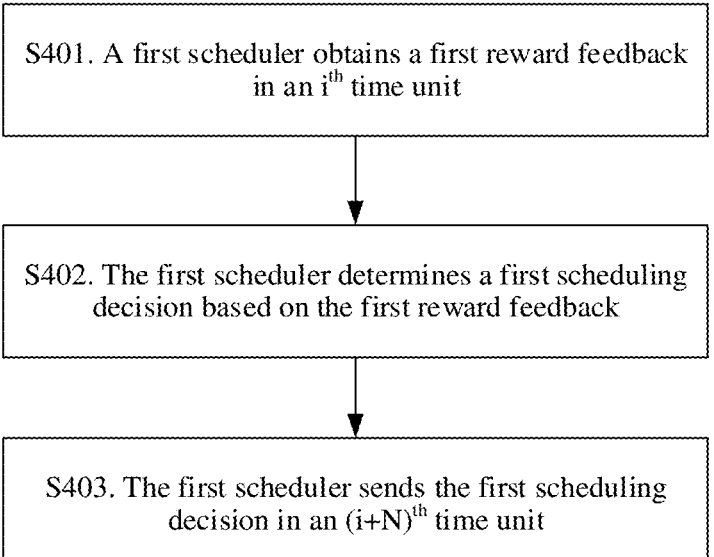
FIG. 4 is a schematic block diagram of a scheduling method according to an embodiment of this application.

FIG. 4 is a schematic block diagram of a scheduling method according to an embodiment of this application. The method is applied to a scheduling system including at least one scheduler.

A scheduling procedure of a first scheduler includes the following steps.

401. The first scheduler obtains a first reward feedback in an $i^{th}$ time unit, where i>1 and i is an integer.

A terminal device sends the first reward feedback to a network device in the $i^{th}$ time unit, the first scheduler obtains the first reward feedback from the network device in the $i^{th}$ time unit, and the first reward feedback is determined by the terminal device based on a scheduling decision (that is, a second scheduling decision) that is lately output by the first scheduler.

It should be understood that the network device herein may be the network device described in FIG. 1. For example, the network device may be a BS, and more specifically, may be a BS baseband.

402. The first scheduler determines a first scheduling decision based on the first reward feedback.

403. The first scheduler sends the first scheduling decision in an $(i+N)^{th}$ time unit.

Optionally, a value of N may be stipulated in a communications system or a communications protocol.

For example, the $i^{th}$ time unit is a frame n, and the first scheduler may send the first scheduling decision in an $N^{th}$ frame after the frame n, where N>1 and N is an integer. For example, a value of N may be N=2, 3, or 5. To be specific, after obtaining the first reward feedback in the frame n, the first scheduler determines the first scheduling decision based on the first reward feedback, and then sends the first scheduling decision in a frame (n+2), a frame (n+3), or a frame (n+5).

The first scheduler sends the first scheduling decision to the network device for DCI coding, and the network device sends DCI to the terminal device in the $(i+N)^{th}$ time unit.

Optionally, the scheduling system may further include one or more second schedulers. The second scheduler and the first scheduler separately output a scheduling decision for a same task, and the first scheduler and the second scheduler deliver a scheduling decision and obtain a scheduling reward feedback in turn.

It should be understood that the same task herein refers to a process in which a system side determines whether a same terminal device is scheduled or a system side allocates a time-frequency resource to a same terminal device in a same scheduling system.

A scheduling procedure of the second scheduler includes the following steps.

(1) The second scheduler obtains a second reward feedback in an $(i+j)^{th}$ time unit, where $1 \leq j \leq N-1$ and j is an integer. For example, when N=2, j=1; or when N=5, j=1, 2, 3, or 4.

The terminal device sends the second reward feedback to the network device in the $(i+j)^{th}$ time unit, the second scheduler obtains the second reward feedback from the network device in the $(i+j)^{th}$ time unit, and the second reward feedback is determined by the terminal device based on a scheduling decision (that is, a fourth scheduling decision) that is lately output by the second scheduler.

(2) The second scheduler determines a third scheduling decision based on the second reward feedback.

(3) The second scheduler sends the third scheduling decision in an $(i+j+M)^{th}$ time unit, where M>1 and M is an integer.

Scheduling performed by the first scheduler and the second scheduler is described below by using an example.

For example, the $i^{th}$ time unit is a frame n, and the first scheduler may send the first scheduling decision in an $N^{th}$ frame after the frame n, where N>1 and N is an integer. For example, a value of N may be N=2, 3, or 5. To be specific, after obtaining the first reward feedback in the frame n, the first scheduler determines the first scheduling decision based on the first reward feedback, and then sends the first scheduling decision in a frame (n+2), a frame (n+3), or a frame (n+5).

The second scheduler sends the third scheduling decision to the network device for DCI coding, and the network device sends DCI to the terminal device in the $(i+j+M)^{th}$ time unit.

Optionally, a value of M may be stipulated in a communications system or a communications protocol.

A scheduling periodicity M of the second scheduler may be equal to a scheduling periodicity N of the first scheduler, or may be unequal to N.

For example, when N=2, the first scheduler delivers a scheduling decision and obtains a scheduling reward feedback in a frame n, a frame (n+2), a frame (n+4), a frame (n+6) . . . .

When M=N=2, j=1, and the second scheduler delivers a scheduling decision and obtains a scheduling reward feedback in a frame (n+1), a frame (n+3), a frame (n+5), a frame (n+7) . . . .

When M=4≠N, j=1, and the second scheduler delivers a scheduling decision and obtains a scheduling reward feedback in a frame (n+1), a frame (n+5), a frame (n+9), a frame (n+13) . . . .

In a case of M≠N, the two schedulers may overlap in a same time unit. For example, if the time periodicity N of the first scheduler is 3, the first scheduler delivers a scheduling decision and obtains a scheduling reward feedback in a frame n, a frame (n+3), a frame (n+6), a frame (n+9) . . . , and if the time periodicity M of the second scheduler is 4, the first scheduler delivers a scheduling decision and obtains a scheduling reward feedback in a frame (n+1), a frame (n+5), the frame (n+9), and a frame (n+13) . . . . In this case, the two schedulers both deliver a scheduling decision and obtain a scheduling reward feedback in the frame (n+9).

In the foregoing case, optionally, the network device selects only one of the schedulers. The selected scheduler normally performs the operations based on a preset scheduling periodicity, and the unselected scheduler skips obtaining a reward feedback, calculating a scheduling decision, and delivering the scheduling decision in current time. If the unselected scheduler does not receive a corresponding scheduling reward in a current time window for receiving a scheduling reward, the unselected scheduler sends a previous scheduling policy again at a next scheduling moment. The time window for receiving a scheduling reward is from previous delivery of a scheduling policy to latest arrival time of a scheduling reward required to calculate a current decision.

In the foregoing case, optionally, the network device may select a scheduler in a pre-stipulated manner, may fixedly select one of the schedulers, may select a scheduler in turn, or may select a scheduler based on another parameter (for example, a scheduler with a relatively lower load is allocated).

Optionally, in a process of determining a scheduler, the first scheduler and the second scheduler may further exchange a scheduling decision.

Optionally, the first scheduler and the second scheduler exchange a decision after a preset time period.

Optionally, the first scheduler and the second scheduler exchange a decision after a preset quantity of scheduling decisions is reached.

Optionally, information exchanged between the first scheduler and the second scheduler may be a latest scheduling decision and a reward corresponding to the decision. For example, the first scheduler may send, to the second scheduler, the first scheduling decision and the reward feedback for the first scheduling decision, or the second scheduler may send, to the first scheduler, the third scheduling decision and the reward feedback for a third scheduling decision.

Optionally, the first scheduler and the second scheduler revise their respective scheduling decisions based on the received exchanged information, so that scheduling decisions of the interactive schedulers gradually converge in a same direction.

Optionally, after receiving the exchanged information, the first scheduler and the second scheduler may not adjust a decision, and each compare, based on the received exchanged information and a scheduling decision of the scheduler, a difference between scheduling decisions output by the two schedulers.

In the foregoing technical solution, when obtaining a reward feedback for a previous scheduling decision, a scheduler does not need to complete calculation of a scheduling decision in a current time unit, and the network device does not need to send DCI in a next time unit but sends the DCI after an interval of one or more time units. This is not limited to an over-the-air frame structure, and leaves sufficient time for the scheduler to calculate and code the scheduling decision, thereby effectively resolving a problem that a scheduling procedure mismatches and conflicts with an over-the-air time sequence when the scheduler cannot obtain a reward of a previous scheduling decision in time. In addition, the first scheduler outputs a scheduling decision across time units in time domain, and therefore one or more second schedulers can make a scheduling decision for a same task by using a time unit that is not used by the first scheduler, thereby improving utilization of a time-frequency resource of a system.

Figure 5A:
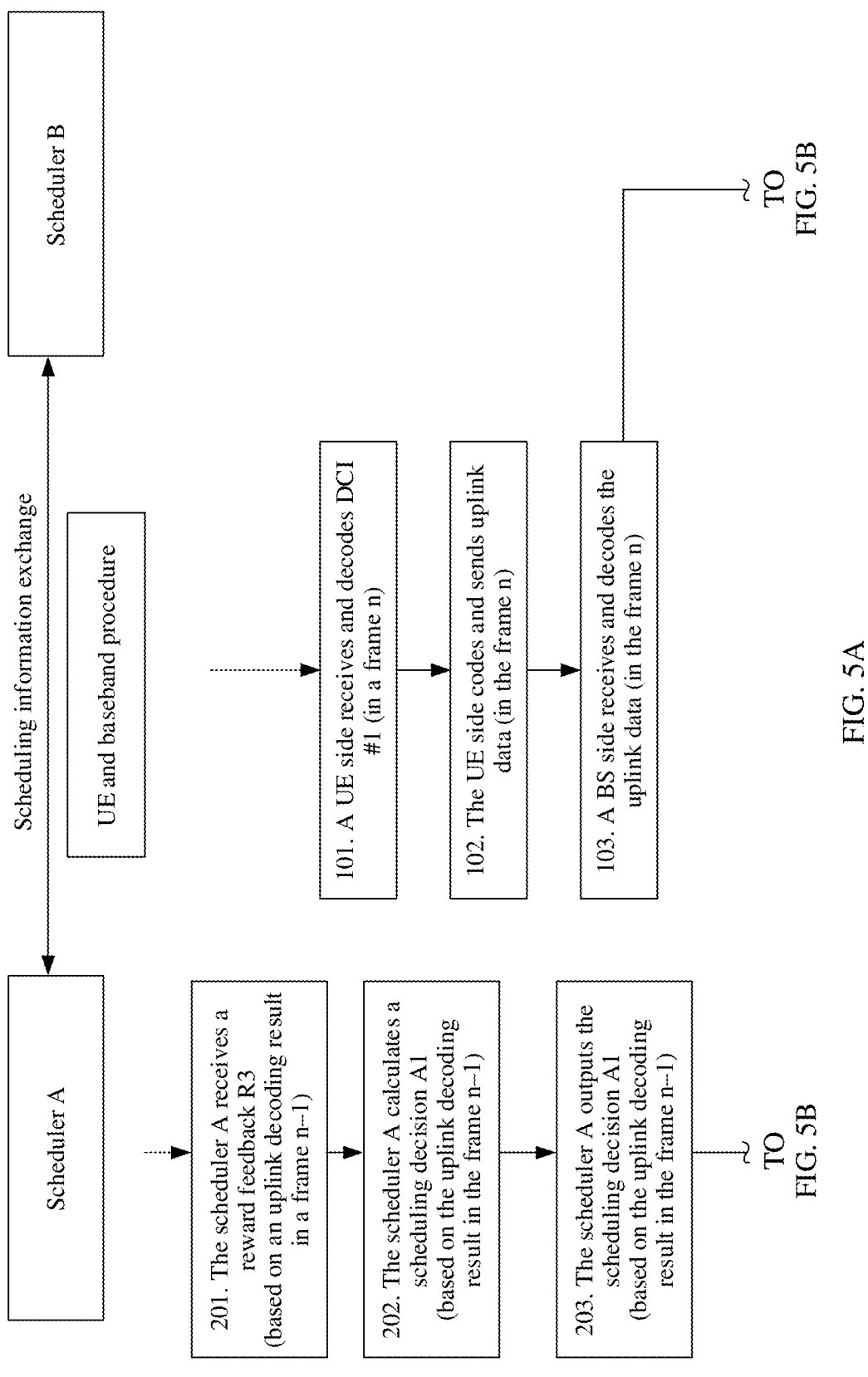

FIG. 5A, FIG. 5B, and FIG. 5C are a schematic flowchart of an uplink BS scheduling method according to an embodiment of this application. FIG. 5A, FIG. 5B, and FIG. 5C include two schedulers: a scheduler A and a scheduler B. It should be understood that FIG. 5A, FIG. 5B, and FIG. 5C merely provides two schedulers as examples. A quantity of schedulers in this application is not limited to the two schedulers in FIG. 5A, FIG. 5B, and FIG. 5C, and there may be three or more schedulers.

When a BS uses a scheduler based on deep reinforcement learning, a system uses the scheduler A (that is, an example of the second scheduler) and the scheduler B (that is, an example of the first scheduler) to jointly cooperate in scheduling. The schedulers obtain scheduling input and output a scheduling decision in turn. A scheduling decision determined by the scheduler A and a scheduling decision determined by the scheduler B are respectively scheduling decisions of the scheduler A and the scheduler B for a same task. A specific uplink scheduling process is as follows.

For the scheduler B, a scheduling procedure is as follows.

101. UE receives and decodes DCI #1 in a frame n.

It should be understood that the DCI #1 herein is generated by a BS baseband through coding based on a scheduling decision (that is, an example of the second scheduling decision) that is lately output by the scheduler B.

102. The UE codes and sends uplink data in the frame n.

The UE performs PUSCH coding on the uplink data based on the received DCI #1 information, and sends coded uplink data to the BS baseband in the frame n.

103. The BS baseband receives and decodes the uplink data in the frame n.

The BS baseband receives the uplink data and decodes the uplink data in the frame n, obtains a reward feedback R1 (that is, an example of the first reward feedback) for a previous uplink scheduling decision from decoded data, and sends the reward feedback R1 to the scheduler B.

It should be noted that in an uplink BS scheduling procedure, the terminal device does not directly calculate a reward feedback, but only codes uplink data based on received DCI information, and the BS obtains a corresponding reward feedback through calculation based on received uplink data.

104. The scheduler B receives the reward feedback R1 sent by the BS baseband.

105. The scheduler B calculates a scheduling decision B1 (that is, an example of the first scheduling decision) based on the reward feedback R1.

106. The scheduler B outputs the scheduling decision B1 to the BS baseband.

107. The BS baseband codes DCI #2, and sends the DCI #2 in a frame (n+2).

The BS baseband integrates, based on the scheduling decision B1 obtained from the scheduler B, the scheduling decision B1 into DCI and codes the DCI to generate the DCI #2, and the BS baseband sends the DCI #2 to the UE in the frame (n+2).

It should be understood that DCI coding can be started immediately after the scheduling decision B1 is received, and may be completed before the BS baseband sends the DCI.

108. The UE receives and decodes the DCI #2 in the frame (n+2).

It should be understood that step 108 is the same as step 101, which indicates that the terminal device and the scheduler start to enter next-round of learning.

109. The UE codes and sends uplink data in the frame (n+2).

The UE performs PUSCH coding on the uplink data based on the received DCI #2, and sends coded uplink data to the BS baseband in the frame (n+2).

110. The BS baseband receives and decodes the uplink data in the frame (n+2).

The BS receives the uplink data and decodes the uplink data in the frame (n+2), obtains a reward feedback R2 for current uplink scheduling from decoded data, and sends the reward feedback R2 to the scheduler B.

111. The scheduler B receives the reward feedback R2.

112. The scheduler B calculates a scheduling decision B2 based on the reward feedback R2.

113. The scheduler B outputs the scheduling decision B2 to the BS baseband. An operation in step 113 is the same as that in step 106. For a subsequent cyclic operation, refer to an operation after step 106.

A scheduling procedure of the scheduler A is the same as the scheduling procedure of the scheduler B, and a difference lies in that the two schedulers make a scheduling decision in different time units.

For the scheduler A, the scheduling procedure is as follows.

201. The scheduler A receives a reward feedback R3 in a frame (n−1).

202. The scheduler A calculates a scheduling decision A1 based on the reward feedback R3.

203. The scheduler A outputs the scheduling decision A1 (that is, an example of the fourth scheduling decision) to the BS baseband.

204. The BS baseband codes DCI #3, and sends the DCI #3 in a frame (n+3).

The BS baseband integrates, based on the scheduling decision A1 obtained from the scheduler A, the scheduling decision A1 into DCI and codes the DCI to generate the DCI #3, and the BS baseband sends the DCI #3 to the UE in a frame (n+3).

It should be understood that DCI coding can be started immediately after the scheduling decision of the scheduler A is received, and may be completed before the BS baseband sends the DCI.

205. The UE receives and decodes the DCI #3 in a frame (n+1).

206. The UE codes and sends uplink data in the frame (n+1).

The UE performs PUSCH coding on the uplink data based on the received DCI #3, and sends coded uplink data to the BS baseband in the frame (n+1).

207. The BS baseband receives and decodes the uplink data in the frame (n+1).

The BS receives the uplink data and decodes the uplink data in the frame (n+1), obtains a reward feedback R4 (that is, an example of the second reward feedback) for current uplink scheduling from decoded data, and sends the reward feedback R4 to the scheduler A.

208. The scheduler A receives the reward feedback R4.

209. The scheduler A calculates a scheduling decision A2 (that is, an example of the third scheduling decision) based on the reward feedback R4.

210. The scheduler A outputs the scheduling decision A2 to the BS baseband.

211. The BS baseband codes DCI #4, and sends the DCI #4 in the frame (n+3).

The BS baseband integrates, based on the scheduling decision A2 obtained from the scheduler A, the scheduling decision A2 into DCI and codes the DCI to generate the DCI #4, and the BS baseband sends the DCI #4 to the UE in the frame (n+3). An operation in step 211 is the same as that in step 204. For a subsequent cyclic operation, refer to an operation after step 204.

Optionally, in a decision process of a scheduler, a plurality of schedulers in a scheduling system may further exchange a scheduling decision, and an exchange periodicity may be defined by a user or a system.

Optionally, the plurality of schedulers exchange a decision after a preset time period.

Optionally, the plurality of schedulers exchange a decision after a preset quantity of scheduling decisions is reached.

Optionally, information exchanged between the plurality of schedulers may be a latest scheduling decision and a reward corresponding to the decision. For example, the scheduler A may send the scheduling decision A1 and the reward feedback R4 to the scheduler B, or the scheduler B may send the scheduling decision B1 and the reward feedback R2 to the scheduler A.

Optionally, the schedulers A and B revise their respective scheduling decisions based on the received exchanged information, so that scheduling decisions of the plurality of schedulers gradually converge in a same direction.

Optionally, after receiving the exchanged information, the schedulers A and B do not adjust a decision, and each compare, based on the received information and a scheduling decision of the scheduler, a difference between scheduling decisions output by the two schedulers.

Compared with a use scenario in which only one scheduler is used, the foregoing technical solution has a wider use scenario. The schedulers A and B alternately obtain an uplink reward feedback and output a scheduling policy to DCI. The UE receives and decodes the DCI and codes uplink data based on a scheduling decision. After receiving uplink decoding, the BS alternately feeds back a scheduling reward result to a corresponding scheduler. After obtaining a scheduling policy from a scheduler and codes DCI, the BS baseband feeds back a latest scheduling reward to the same scheduler. The BS baseband obtains a scheduling policy from another scheduler next time, and then feeds back a latest scheduling reward to the another scheduler. The solution using a plurality of schedulers can effectively improve adaptability of the scheduler to a change in an over-the-air environment. In addition, schedulers each have a function of exchanging information with each other, and can adjust a scheduling parameter of the scheduler, to ensure that scheduling policies of different schedulers are similar or the same and a scheduling reward is maximized.

Figure 6A:
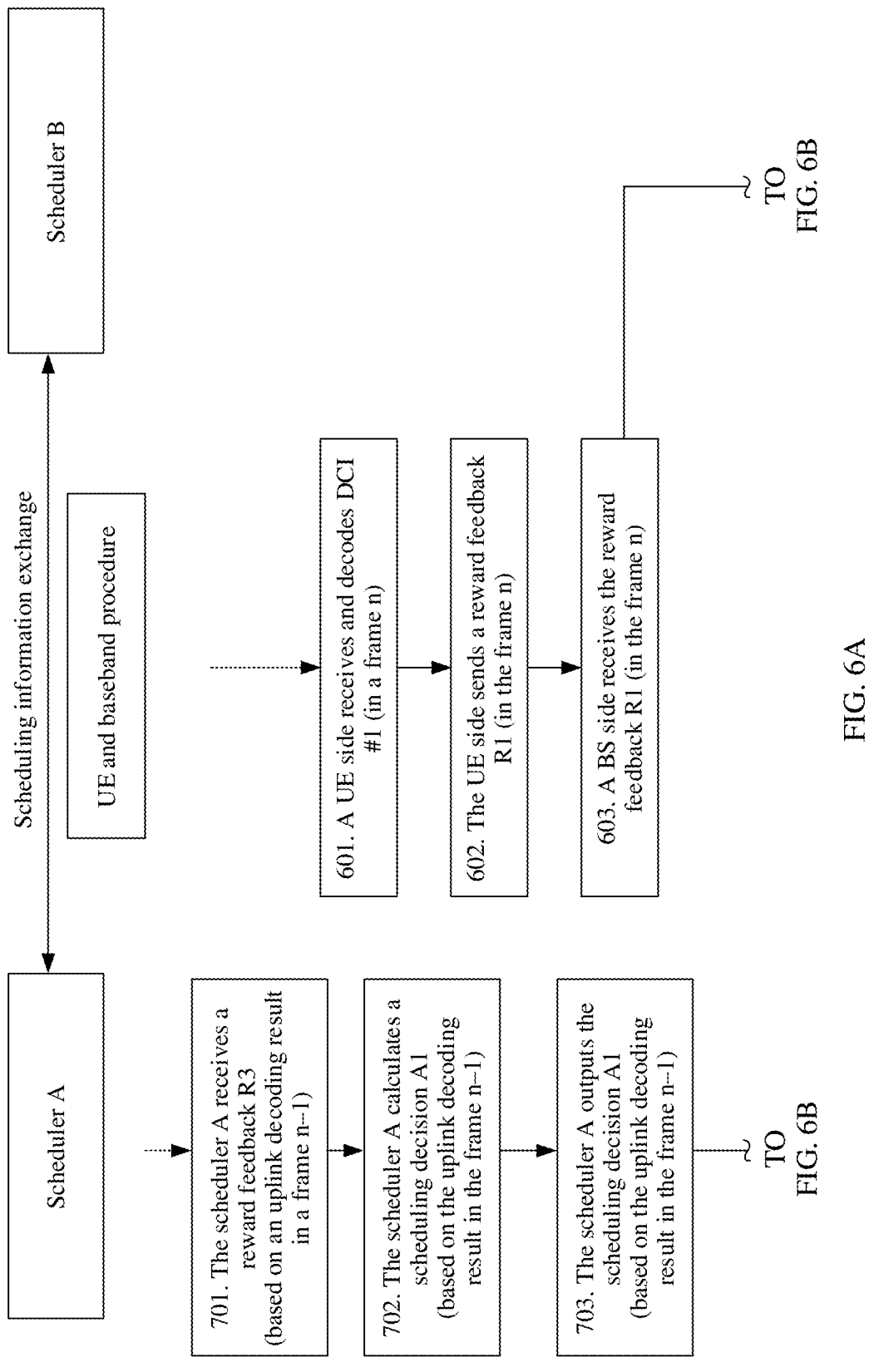

FIG. 6A, FIG. 6B, and FIG. 6C are a schematic flowchart of a downlink BS scheduling method according to an embodiment of this application. FIG. 6A, FIG. 6B, and FIG. 6C include two schedulers: a scheduler A and a scheduler B. It should be understood that FIG. 6A, FIG. 6B, and FIG. 6C merely provide two schedulers as examples. A quantity of schedulers in this application is not limited to the two schedulers in FIG. 6A, FIG. 6B, and FIG. 6C, and there may be three or more schedulers.

When a BS uses a scheduler based on deep reinforcement learning, a system uses the scheduler A and the scheduler B to jointly cooperate in scheduling. The schedulers obtain scheduling input and output a scheduling decision in turn. A specific downlink scheduling process is as follows.

For the scheduler B, a scheduling procedure is as follows.

601. UE receives and decodes DCI #1 in a frame n.

It should be understood that the DCI #1 herein is generated by a BS baseband through coding based on a scheduling decision (that is, an example of the second scheduling decision) that is lately output by the scheduler B.

602. The UE sends a reward feedback R1 in the frame n.

The UE determines the reward feedback R1 based on the received DCI #1 information, codes the reward feedback R1, and sends a coded reward feedback R1 to the BS baseband in the frame n.

It should be noted that, different from the uplink BS scheduling procedure, in a downlink BS scheduling procedure, the terminal device directly calculates a reward feedback, codes the calculated reward feedback, and feeds back a coded reward feedback to the BS baseband. The BS baseband can directly obtain the current reward feedback by simply decoding received data.

606. The BS baseband receives the reward feedback R1 in the frame n.

The BS baseband receives uplink data and decodes the uplink data in the frame n, obtains the reward feedback R1 (that is, an example of the first reward feedback) from decoded data, and sends the reward feedback R1 to the scheduler B.

604. The scheduler B receives the reward feedback R1 sent by the BS baseband.

603. The scheduler B calculates a scheduling decision B1 (that is, an example of the first scheduling decision) based on the reward feedback R1.

606. The scheduler B outputs the scheduling decision B1 to the BS baseband.

607. The BS baseband codes DCI #2, and sends the DCI #2 in a frame (n+2).

The BS baseband integrates, based on the scheduling decision B1 obtained from the scheduler B, the scheduling decision B1 into the DCI #2 and performs PDSCH coding on downlink data. The BS baseband sends the DCI #2 and coded downlink data to the UE in the frame (n+2).

It should be understood that the BS baseband can start DCI coding immediately after receiving the scheduling decision, and may complete DCI coding before the BS baseband sends the DCI.

608. The UE receives and decodes the DCI #2 in the frame (n+2).

It should be understood that step 608 is the same as step 601, which indicates that the terminal device and the scheduler start to enter next-round of learning.

609. The UE sends a reward feedback R2 in the frame (n+2).

The UE performs PUSCH coding on uplink data based on the received DCI #2, and sends coded uplink data to the BS baseband in the frame (n+2).

The UE determines the reward feedback R2 based on the received DCI #2 information, codes the reward feedback R2, and sends a coded reward feedback R2 to the BS baseband in the frame n+2.

610. The BS baseband receives the reward feedback R2 in the frame (n+2).

The BS receives the uplink data and decodes the uplink data in the frame (n+2), obtains the reward feedback R2 from decoded data, and sends the reward feedback R2 to the scheduler B.

611. The scheduler B receives the reward feedback R2.

612. The scheduler B calculates a scheduling decision B2 based on the reward feedback R2.

613. The scheduler B outputs the scheduling decision B2 to the BS baseband. An operation in step 613 is the same as that in step 606. For a subsequent cyclic operation, refer to an operation after step 306.

A scheduling procedure of the scheduler A is the same as the scheduling procedure of the scheduler B, and a difference lies in that the two schedulers make a scheduling decision in different time units.

For the scheduler A, the scheduling procedure is as follows.

701. The scheduler A receives a reward feedback R3 in a frame (n−1).

702. The scheduler A calculates a scheduling decision A1 based on the reward feedback R3.

703. The scheduler A outputs the scheduling decision A1 (that is, an example of the fourth scheduling decision) to the BS baseband.

704. The BS baseband codes DCI #3, and sends the DCI #3 in a frame (n+3).

The BS baseband integrates, based on the scheduling decision A1 obtained from the scheduler A, the scheduling decision A1 into the DCI #3 and performs PDSCH coding on downlink data. The BS baseband sends the DCI #3 and the downlink data to the UE in a frame (n+3).

It should be understood that the BS baseband can start DCI coding immediately after receiving the scheduling decision, and may complete DCI coding before the BS baseband sends the DCI.

705. The UE receives and decodes the DCI #3 in a frame (n+1).

706. The UE sends a reward feedback R4 in the frame (n+1).

The UE determines the reward feedback R4 based on the received DCI #3 information, codes the reward feedback R4, and sends a coded reward feedback R4 to the BS baseband in the frame (n+1).

707. The BS baseband receives the reward feedback R4 in the frame (n+1).

The BS receives the uplink data and decodes the uplink data in the frame (n+1), obtains the reward feedback R4 (that is, an example of the second reward feedback) from decoded data, and sends the reward feedback R4 to the scheduler A.

708. The scheduler A receives the reward feedback R4.

709. The scheduler A calculates a scheduling decision A2 (that is, an example of the third scheduling decision) based on the reward feedback R4.

710. The scheduler A outputs the scheduling decision A2 to the BS baseband.

711. The BS baseband codes DCI #4, and sends the DCI #4 in the frame (n+3).

The BS baseband integrates, based on the scheduling decision A2 obtained from the scheduler A, the scheduling decision A2 into the DCI #4 and performs PDSCH coding on downlink data. The BS baseband sends the DCI #4 and the downlink data to the UE in the frame (n+3). An operation in step 711 is the same as that in step 704. For a subsequent cyclic operation, refer to an operation after step 704.

In the downlink scheduling procedure, the schedulers A and B may also exchange and adjust a scheduling decision. Details are not described herein.

In the foregoing technical solution, the schedulers A and B alternately obtain a reward feedback, output a scheduling decision to DCI, and code downlink data based on the scheduling decision. The UE receives and decodes the DCI, and determines a reward feedback for the scheduling decision based on the scheduling decision. After receiving the reward feedback, the BS alternately feeds back a scheduling reward result to a corresponding scheduler. After obtaining a scheduling policy from a scheduler and codes DCI, the BS baseband feeds back a latest scheduling reward to the same scheduler. The BS baseband obtains a scheduling policy from another scheduler next time, and then feeds back a latest scheduling reward to the another scheduler. Compared with a use scenario in which only one scheduler is used, this has a wider use scenario and is not limited to an over-the-air frame structure. For example, the scheduler has sufficient time to calculate a scheduling decision after receiving a reward feedback, and the BS baseband also has sufficient time to perform coding after receiving a scheduling decision, thereby resolving impact of an over-the-air feedback delay on deep reinforcement learning of the scheduler. In addition, schedulers each have a function of exchanging information with each other, and can adjust a scheduling parameter of the scheduler, to ensure that scheduling policies of different schedulers are similar or the same and a scheduling reward is maximized.

Figure 7A:
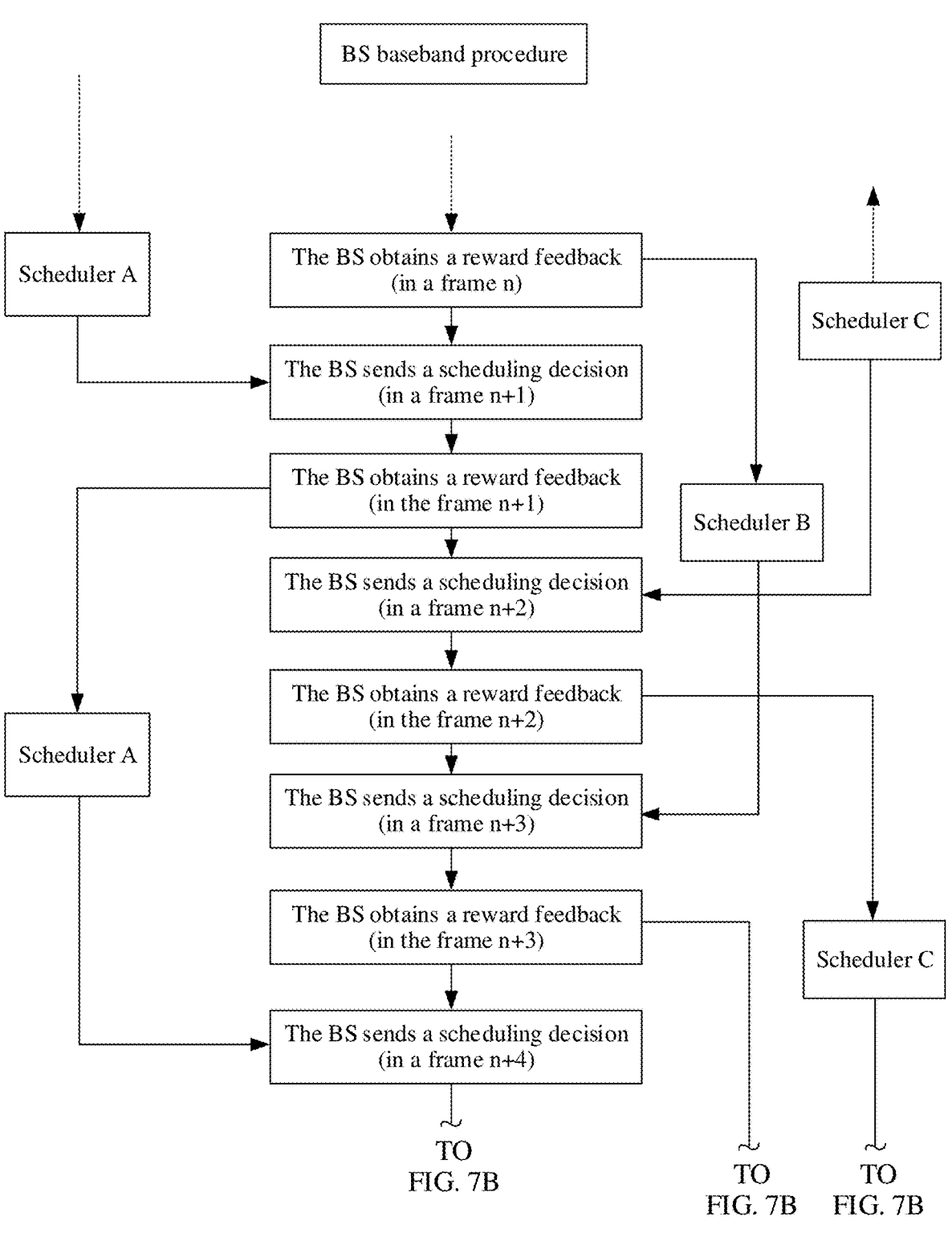
FIG. 7A and FIG. 7B are a schematic flowchart in which a plurality of BS schedulers perform a scheduling method according to an embodiment of this application.
Figure 7B:
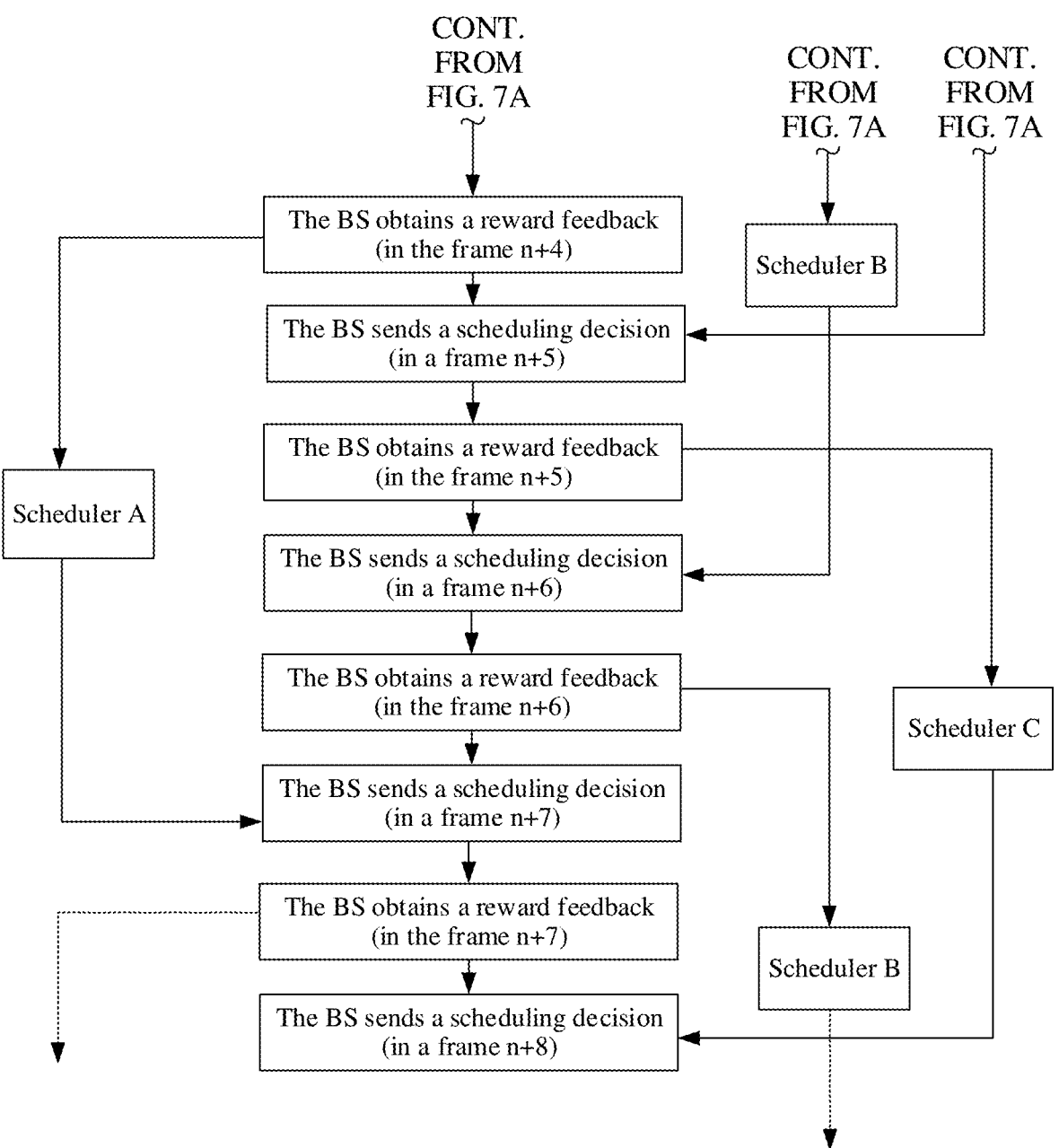

FIG. 7A and FIG. 7B are a schematic flowchart in which a plurality of BS schedulers perform a scheduling method according to an embodiment of this application. FIG. 7A and FIG. 7B include three schedulers: a scheduler A, a scheduler B, and a scheduler C.

It may be learned from FIG. 7A and FIG. 7B that a scheduling sequence of the three schedulers is B, A, C, B, A, and C. The scheduler B obtains a reward feedback from a BS baseband in a frame n, and a BS outputs a scheduling decision of the scheduler B in a frame (n+3); the scheduler A obtains a reward feedback from the BS baseband in a frame (n+1), and the BS outputs a scheduling decision of the scheduler A in a frame (n+4); and the scheduler C obtains a reward feedback from the BS baseband in a frame (n+2), and the BS outputs a scheduling decision of the scheduler C in a frame (n+5). For specific scheduling processes of the scheduler A, the scheduler B, and the scheduler C, refer to the descriptions in FIG. 5A, FIG. 5B, and FIG. 5C and FIG. 6A, FIG. 6B, and FIG. 6C. Details are not described herein again.

Similarly, when Q (Q>3 and Q is an integer) schedulers exist, the scheduler A obtains the reward feedback from the BS baseband in the frame (n+1), the BS outputs the scheduling decision of the scheduler A in a frame (n+1+N), the scheduler B obtains the reward feedback from the BS baseband in the frame n, the BS outputs the scheduling decision of the scheduler B in a frame (n+N), the scheduler C obtains the reward feedback from the BS baseband in the frame (n+2), and the BS outputs the scheduling decision of the scheduler C in a frame (n+2+N), where N≥Q and N is an integer. A remaining scheduler may receive a reward feedback and output a decision in a reserved frame according to the foregoing rule. Details are not described herein.

It should be noted that in this application, an alternating and polling sequence of the schedulers is not limited to sequential output, provided that a scheduling sequence of the plurality of schedulers is regular in terms of a time unit. For example, a scheduling sequence of the schedulers A and B in FIG. 5A, FIG. 5B, and FIG. 5C and FIG. 6A, FIG. 6B, and FIG. 6C may be a periodic regular sequence such as a sequence of A, B, B, A, B, B, and A, or a sequence of A, A, B, B, A, A, B, and B. A scheduling sequence of the schedulers A, B, and C in FIG. 7A and FIG. 7B may be a periodic regular sequence such as a sequence of A, B, A, C, A, B, A, and C, or a sequence of A, B, B, A, C, A, B, B, A, and C.

The scheduling method provided in this application is described above in detail, and a scheduling apparatus provided in this application is described below.

Figure 8:
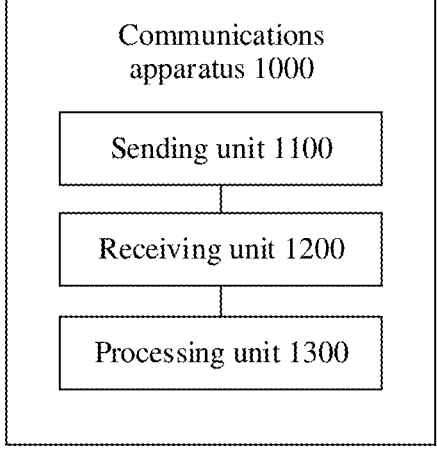
FIG. 8 is a schematic block diagram of a scheduling apparatus 1000 according to this application.

FIG. 8 is a schematic block diagram of a scheduling apparatus 1000 according to this application. As shown in FIG. 8, the scheduling apparatus 1000 includes a sending unit 1100, a receiving unit 1200, and a processing unit 1300.

The sending unit 1100 is configured to send a first reward feedback in an $i^{th}$ time unit, where i≥1 and i is an integer.

The receiving unit is configured to receive, in an $(i+N)^{th}$ time unit, a first scheduling decision determined by a first scheduler based on the first reward feedback.

The processing unit 1300 is configured to determine the first reward feedback based on a second scheduling decision, where the second scheduling decision is a previous scheduling decision determined by the first scheduler before the first scheduling decision, and N>1 and N is an integer.

Optionally, in an embodiment, the sending unit 1100 is further configured to send a second reward feedback in an $(i+j)^{th}$ time unit, where 1≤≤N−1 and j is an integer.

The receiving unit 1200 is configured to receive, in an $(i+j+M)^{th}$ time unit, a third scheduling decision determined by a second scheduler based on the second reward feedback, where M>1 and M is an integer.

The processing unit 1300 is configured to determine the second reward feedback based on a fourth scheduling decision, where the fourth scheduling decision is a previous scheduling decision determined by the second scheduler before the third scheduling decision, and the scheduling decision determined by the first scheduler and the scheduling decision determined by the second scheduler are respectively scheduling decisions of the first scheduler and the second scheduler for a same task.

Optionally, the receiving unit 1200 and the sending unit 1100 may also be integrated into a transceiver unit that has both a receiving function and a sending function. This is not limited herein.

Optionally, in an embodiment, N is equal to 2.

Optionally, in an embodiment, a value of N is stipulated in a communications system or a communications protocol.

In an implementation, the scheduling apparatus 1000 may be the terminal device in the method embodiment. In this implementation, the sending unit 1100 may be a transmitter, and the receiving unit 1200 may be a receiver. The receiver and the transmitter may also be integrated into a transceiver. The processing unit 1300 may be a processing apparatus.

In another implementation, the scheduling apparatus 1000 may be a chip or an integrated circuit installed in the terminal device. In this implementation, the sending unit 1100 and the receiving unit 1200 each may be a communications interface or an interface circuit. For example, the sending unit 1100 is an output interface or an output circuit, the receiving unit 1200 is an input interface or an input circuit, and the processing unit 1300 may be a processing apparatus.

A function of the processing apparatus may be implemented by using hardware, or may be implemented by executing corresponding software by hardware. For example, the processing apparatus may include a memory and a processor. The memory is configured to store a computer program, and the processor reads and executes the computer program stored in the memory, so that the scheduling apparatus 1000 performs operations and/or processing performed by the terminal device in the method embodiments. Optionally, the processing apparatus may include only a processor, and a memory configured to store a computer program is located outside the processing apparatus. The processor is connected to the memory by using a circuit/wire to read and execute the computer program stored in the memory. For another example, the processing apparatus may be a chip or an integrated circuit.

Figure 9:
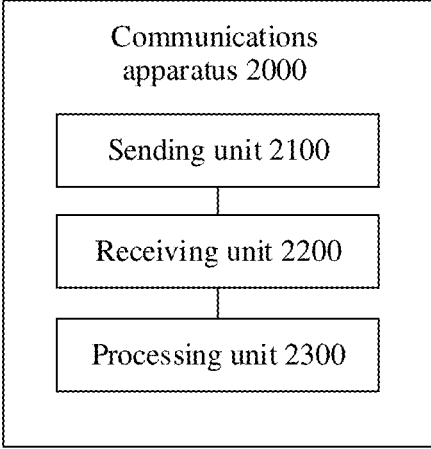
FIG. 9 is a schematic block diagram of a scheduling apparatus 2000 according to this application.

FIG. 9 is a schematic block diagram of a scheduling apparatus 2000 according to this application. As shown in FIG. 9, the scheduling apparatus 2000 includes a sending unit 2100, a receiving unit 2200, and a processing unit 2300.

The processing unit 2300 is configured to obtain a first reward feedback in an $i^{th}$ time unit, where i≥1 and i is an integer.

The processing unit 2300 is further configured to determine a first scheduling decision based on the first reward feedback, where the first reward feedback is determined by a terminal device based on a second scheduling decision, and the second scheduling decision is a previous scheduling decision determined by the processing unit before the first scheduling decision.

The sending unit 2100 is configured to send the first scheduling decision before an $(i+N)^{th}$ time unit, where N>1 and N is an integer.

Optionally, the sending unit 2100 and the receiving unit 2200 may also be integrated into a transceiver unit that has both a receiving function and a sending function. This is not limited herein.

In an implementation, the scheduling apparatus 2000 may be the first scheduler or the second scheduler in the method embodiment. In this implementation, the sending unit 2100 may be a transmitter, and the receiving unit 2200 may be a receiver. The receiver and the transmitter may also be integrated into a transceiver. The processing unit 2300 may be a processing apparatus.

In another implementation, the scheduling apparatus 2000 may be a chip or an integrated circuit installed in the first scheduler or the second scheduler. In this implementation, the sending unit 2100 and the receiving unit 2200 each may be a communications interface or an interface circuit. For example, the sending unit 2100 is an output interface or an output circuit, the receiving unit 2200 is an input interface or an input circuit, and the processing unit 2300 may be a processing apparatus.

A function of the processing apparatus may be implemented by using hardware, or may be implemented by executing corresponding software by hardware. For example, the processing apparatus may include a memory and a processor. The memory is configured to store a computer program, and the processor reads and executes the computer program stored in the memory, so that the scheduling apparatus 2000 performs operations and/or processing performed by the first scheduler or the second scheduler in the method embodiments. Optionally, the processing apparatus may include only a processor, and a memory configured to store a computer program is located outside the processing apparatus. The processor is connected to the memory by using a circuit/wire to read and execute the computer program stored in the memory. For another example, the processing apparatus may be a chip or an integrated circuit.

Figure 10:
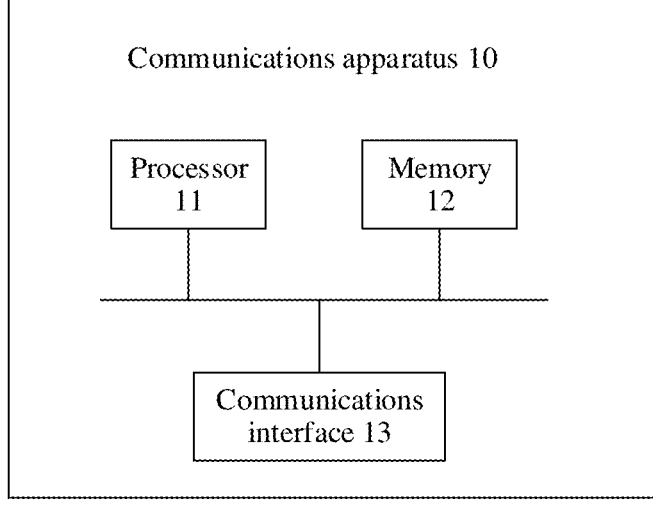
FIG. 10 is a schematic diagram of a structure of a communications apparatus 10 according to this application.

FIG. 10 is a schematic diagram of a structure of a communications apparatus 10 according to this application. As shown in FIG. 10, the communications apparatus 10 includes one or more processors 11, one or more memories 12, and one or more communications interfaces 13. The processor 11 is configured to control the communications interface 13 to send and receive a signal, and the memory 12 is configured to store a computer program. The processor 11 is configured to invoke the computer program from the memory 12 and run the computer program, so that procedures and/or operations performed by the terminal device in the method embodiments of this application are performed.

For example, the processor 11 may have a function of the processing unit 1300 shown in FIG. 8, and the communications interface 13 may have a function of the sending unit 1100 and/or a function of the receiving unit 1200 shown in FIG. 8. Specifically, the processor 11 may be configured to perform processing or operations performed inside the terminal device in FIG. 4 to FIG. 7A and FIG. 7B, and the communications interface 13 is configured to perform a sending action and/or a receiving action performed by the terminal device in FIG. 4 to FIG. 7A and FIG. 7B.

In an implementation, the communications apparatus 10 may be the terminal device in the method embodiment. In this implementation, the communications interface 13 may be a transceiver. The transceiver may include a receiver and a transmitter.

Optionally, the processor 11 may be a baseband apparatus, and the communications interface 13 may be a radio frequency apparatus.

In another implementation, the communications apparatus 10 may be a chip installed in the terminal device. In this implementation, the communications interface 13 may be an interface circuit or an input/output interface.

Figure 11:
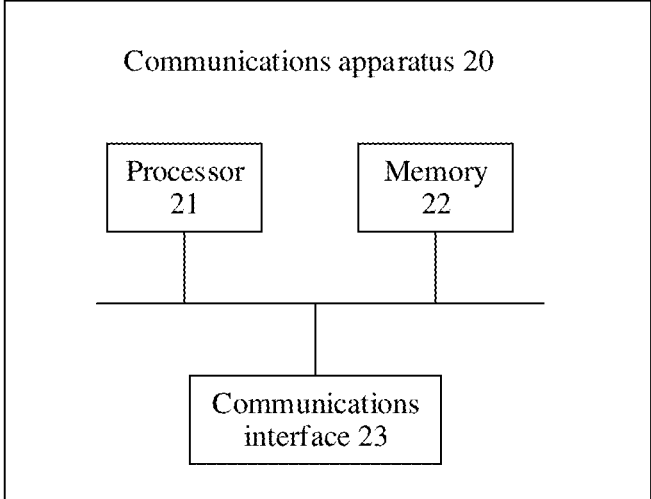
FIG. 11 is a schematic diagram of a structure of a communications apparatus 20 according to this application.

FIG. 11 is a schematic diagram of a structure of a communications apparatus 20 according to this application. As shown in FIG. 11, the communications apparatus 20 includes one or more processors 21, one or more memories 22, and one or more communications interfaces 23. The processor 21 is configured to control the communications interface 23 to send and receive a signal, and the memory 22 is configured to store a computer program. The processor 21 is configured to invoke the computer program from the memory 22 and run the computer program, so that procedures and/or operations performed by the first scheduler or the second scheduler in the method embodiments of this application are performed.

For example, the processor 21 may have a function of the processing unit 2300 shown in FIG. 9, and the communications interface 23 may have functions of the sending unit 2100 and the receiving unit 2200 shown in FIG. 9. Specifically, the processor 21 may be configured to perform processing or operations performed inside the first scheduler or the second scheduler in FIG. 4 to FIG. 7A and FIG. 7B, and the communications interface 23 is configured to perform a sending action and/or a receiving action performed by the first scheduler or the second scheduler in FIG. 4 to FIG. 7A and FIG. 7B. Details are not described again.

Optionally, the processor and the memory in the foregoing apparatus embodiments may be units physically independent of each other, or the memory and the processor may be integrated.

This is not limited in this specification.

In addition, this application further provides a computer-readable storage medium, and the computer-readable storage medium stores computer instructions. When the computer instructions are run on a computer, operations and/or procedures performed by the terminal device in the method embodiments of this application are performed.

This application further provides a computer-readable storage medium, and the computer-readable storage medium stores computer instructions. When the computer instructions are run on a computer, operations and/or procedures performed by the first scheduler or the second scheduler in the method embodiments of this application are performed.

This application further provides a computer program product, and the computer program product includes computer program code or instructions. When the computer program code or the instructions are run on a computer, operations and/or procedures performed by the terminal device in the method embodiments of this application are performed.

This application further provides a computer program product, and the computer program product includes computer program code or instructions. When the computer program code or the instructions are run on a computer, operations and/or procedures performed by the first scheduler or the second scheduler in the method embodiments of this application are performed.

In addition, this application further provides a chip, and the chip includes a processor. A memory configured to store a computer program is disposed independent of the chip. The processor is configured to execute the computer program stored in the memory, so that operations and/or processing performed by the terminal device in any method embodiment are/is performed.

Further, the chip may include a communications interface. The communications interface may be an input/output interface, or may be an interface circuit or the like. Further, the chip may include the memory.

This application further provides a chip, and the chip includes a processor. A memory configured to store a computer program is disposed independent of the chip. The processor is configured to execute the computer program stored in the memory, so that operations and/or processing performed by the first scheduler or the second scheduler in any method embodiment are/is performed.

Further, the chip may include a communications interface. The communications interface may be an input/output interface, or may be an interface circuit or the like. Further, the chip may include the memory.

In addition, this application further provides a scheduling system, including some or all of the terminal device, the network device, the first scheduler, and the second scheduler in the embodiments of this application.

The processor in embodiments of this application may be an integrated circuit chip, and has a signal processing capability. In an implementation process, steps in the foregoing method embodiments are implemented by using a hardware integrated logic circuit in the processor, or by using instructions in a form of software. The processor may be a general-purpose processor, a digital signal processor (digital signal processor, DSP), an application-specific integrated circuit (application specific integrated circuit, ASIC), a field programmable gate array (field programmable gate array, FPGA) or another programmable logic device, a discrete gate or transistor logic device, or a discrete hardware component. The general-purpose processor may be a microprocessor, or the processor may be any conventional processor or the like. The steps of the methods disclosed in embodiments of this application may be directly presented as being performed and completed by a hardware encoding processor, or performed and completed by a combination of hardware and a software module in an encoding processor. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing methods in combination with hardware of the processor.

The memory in embodiments of this application may be a volatile memory or a non-volatile memory, or may include both a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (random access memory, RAM), used as an external cache. As an example description instead of a limitative description, many forms of RAMs are available, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DRRAM). It should be noted that the memory in the systems and methods described in this specification is intended to include, but not limited to these and any memory of another proper type.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In several embodiments provided in this application, it should be understood that the disclosed system, apparatus, and method may be implemented in another manner. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or another form.

The units described as separate parts may or may not be physically separate, and parts displayed as units may or may not be physical units, may be located in one position, or may be distributed on a plurality of network units. Some or a part of the units may be selected based on actual requirements to achieve the objectives of the solutions of embodiments.

In addition, function units in embodiments of this application may be integrated into one processing unit, each of the units may exist alone physically, or two or more units may be integrated into one unit.

The term "and/or" in this specification describes only an association relationship for describing associated objects and represents that three relationships may exist. For example, A and/or B may represent the following three cases: Only A exists, both A and B exist, and only B exists. A, B, and C each may be a singular number or a plural number, which is not limited.

When the functions are implemented in the form of a software function unit and sold or used as an independent product, the functions may be stored in a computer-readable storage medium. Based on such an understanding, the technical solutions of this application essentially, or some of the technical solutions may be implemented in a form of a software product. The computer software product is stored in a storage medium, and includes several instructions for instructing a computer device (which may be a personal computer, a server, or a network device) to perform all or a part of the steps of the methods described in embodiments of this application. The foregoing storage medium includes any medium that can store program code, such as a USB flash drive, a removable hard disk, a ROM, a RAM, a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A scheduling method, applied to a scheduling system comprising at least one scheduler, and the method comprises:

obtaining, by a first scheduler, a first reward feedback in an $i^{th}$ time unit, wherein $i \geq 1$ and i is an integer;

determining, by the first scheduler, a first scheduling decision based on the first reward feedback, wherein the first reward feedback is received by the first scheduler from a terminal device based on a second scheduling decision, and the second scheduling decision is a previous scheduling decision determined by the first scheduler before the first scheduling decision; and sending, to the terminal device by the first scheduler, the first scheduling decision in an $(i+N)^{th}$ time unit, wherein $N>1$ and N is an integer, wherein the method further comprising:

obtaining, by a second scheduler, a second reward feedback in an $(i+j)^{th}$ time unit, wherein $1 \leq j \leq N-1$ and j is an integer;

determining, by the second scheduler, a third scheduling decision based on the second reward feedback, wherein the second reward feedback is received by the second scheduler from the terminal device based on a fourth scheduling decision, and the fourth scheduling decision is a previous scheduling decision determined by the second scheduler before the third scheduling decision;

the scheduling decision determined by the first scheduler and the scheduling decision determined by the second scheduler are respectively scheduling decisions of the first scheduler and the second scheduler for a same task; and sending, by the second scheduler, the second scheduling decision to the terminal device in an $(i+j+M)^{th}$ time unit, wherein $M>1$ and M is an integer.

2. The method according to claim 1, wherein the method further comprises:

sending, by the first scheduler, first information to the second scheduler, wherein the first information includes the first scheduling decision or a third reward feedback, and the third reward feedback is received by the first scheduler from the terminal device based on the first scheduling decision; and receiving, by the second scheduler, the first information, and adjusting, based on the first information, a subsequent scheduling decision for the task.

3. The method according to claim 1, wherein the method further comprises:

sending, by the second scheduler, second information to the first scheduler, wherein the second information includes the second scheduling decision or a fourth reward feedback, and the fourth reward feedback is received by the second scheduler from the terminal device based on the second scheduling decision; and receiving, by the first scheduler, the second information, and adjusting, based on the second information, a subsequent scheduling decision for the task.

4. A scheduling method, comprising:

sending, by a terminal device, a first reward feedback in an $i^{th}$ time unit, wherein $i \geq 1$ and i is an integer; and receiving, by the terminal device in an $(i+N)^{th}$ time unit, a first scheduling decision from a first scheduler based on the first reward feedback, wherein the first reward feedback is determined by the terminal device based on a second scheduling decision, the second scheduling decision is a previous scheduling decision received from the first scheduler before the first scheduling decision, and $N>1$ and N is an integer, wherein the method further comprises:

sending, by the terminal device, a second reward feedback in an $(i+j)^{th}$ time unit, wherein $1 \leq j \leq N-1$ and j is an integer; and receiving, by the terminal device in an $(i+j+M)^{th}$ time unit, a third scheduling decision from a second scheduler based the second reward feedback, wherein $M>1$ and M is an integer, wherein the second reward feedback is determined by the terminal device based on a fourth scheduling decision, and the fourth scheduling decision is a previous scheduling decision received from the second scheduler before the third scheduling decision; and the scheduling decision received from the first scheduler and the scheduling decision received from the second scheduler are respectively scheduling decisions of the first scheduler and the second scheduler for a same task.

5. The method according to claim 4, wherein N is equal to 2.

6. The method according to claim 4, wherein a value of N is stipulated in a communications system or a communications protocol.

7. An apparatus, comprising:

a memory storing computer-readable instructions; and one or more processors connected to the memory, wherein the processor is configured to execute the computer-readable instructions to:

send a first reward feedback in an ith time unit, wherein $i \geq 1$ and i is an integer; and receive in an $(i+N)^{th}$ time unit, a first scheduling decision from a first scheduler based on the first reward feedback, wherein the first reward feedback is based on a second scheduling decision, the second scheduling decision is a previous scheduling decision received before the first scheduling decision, and $N>1$ and N is an integer, wherein the one or more processors are further configured to:

send a second reward feedback in an $(i+j)^{th}$ time unit, wherein $1 \leq j \leq N-1$ and j is an integer; and receive in an $(i+j+M)^{th}$ time unit, a third scheduling decision from a second scheduler based the second reward feedback, wherein $M>1$ and M is an integer, wherein the second reward feedback is based on a fourth scheduling decision, and the fourth scheduling decision is a previous scheduling decision received from the second scheduler before the third scheduling decision; and the fourth scheduling decision and the third scheduling decision are respectively scheduling decisions for a same task.

8. The apparatus according to claim 7, wherein N is equal to 2.

9. The apparatus according to claim 7, wherein a value of N is stipulated in a communications system or a communications protocol.

* * * * *